(12) United States Patent
Schultz et al.

(10) Patent No.: US 10,375,111 B2
(45) Date of Patent: Aug. 6, 2019

(54) ANONYMOUS CONTAINERS

(71) Applicant: Microsoft Technology Licensing, LLC, Redmond, WA (US)

(72) Inventors: Benjamin M. Schultz, Bellevue, WA (US); Frederick Justus Smith, Redmond, WA (US); Daniel Vasquez Lopez, Duvall, WA (US); Abhinav Mishra, Redmond, WA (US); Ian James McCarty, Redmond, WA (US); John A. Starks, Seattle, WA (US); Joshua David Ebersol, Redmond, WA (US); Ankit Srivastava, Seattle, WA (US); Hari R. Pulapaka, Redmond, WA (US); Mehmet Iyigun, Kirland, WA (US); Stephen E. Bensley, Kirland, WA (US); Giridhar Viswanathan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 233 days.

(21) Appl. No.: 15/430,301

(22) Filed: Feb. 10, 2017

(65) Prior Publication Data

US 2018/0139238 A1    May 17, 2018

Related U.S. Application Data

(60) Provisional application No. 62/421,254, filed on Nov. 12, 2016.

(51) Int. Cl.
*H04L 9/00* (2006.01)
*H04L 29/06* (2006.01)
(Continued)

(52) U.S. Cl.
CPC ...... *H04L 63/1491* (2013.01); *G06F 9/45558* (2013.01); *G06F 21/53* (2013.01);
(Continued)

(58) Field of Classification Search
CPC ............. H04L 63/1491; H04L 63/0272; H04L 63/0421; G06F 21/53; G06F 21/6254
See application file for complete search history.

(56) References Cited

U.S. PATENT DOCUMENTS 8,078,740 B2  12/2011  Franco et al.
8,640,187 B2   1/2014  Walsh
(Continued)

FOREIGN PATENT DOCUMENTS

WO   2014193443 A1   12/2014
WO   2016122410 A1    8/2016

OTHER PUBLICATIONS

Haq, et al., "Page reclamation technique for VMM based application sandbox", In Proceedings of IEEE Information Technology, Networking, Electronic and Automation Control Conference, May 20, 2016, pp. 70-74.
(Continued)

*Primary Examiner* — Beemnet W Dada
(74) *Attorney, Agent, or Firm* — Liang IP, PLLC

(57) ABSTRACT

Anonymous containers are discussed herein. An operating system running on a computing device, also referred to herein as a host operating system running on a host device, prevents an application from accessing personal information (e.g., user information or corporate information) by activating an anonymous container that is isolated from the host operating system. In order to create and activate the anonymous container, a container manager anonymizes the configuration and settings data of the host operating system, and injects the anonymous configuration and settings data into
(Continued)

the anonymous container. Such anonymous configuration and settings data may include, by way of example and not limitation, application data, machine configuration data, and user settings data. The host operating system then allows the application to run in the anonymous container.

20 Claims, 10 Drawing Sheets

(51) Int. Cl.
*G06F 21/62* (2013.01)
*G06F 9/455* (2018.01)
*G06F 21/53* (2013.01)

(52) U.S. Cl.
CPC ...... *G06F 21/6254* (2013.01); *H04L 63/0272* (2013.01); *H04L 63/0421* (2013.01); *G06F 2009/45587* (2013.01)

(56) References Cited

U.S. PATENT DOCUMENTS

| | | |
|---|---|---|
| 9,183,008 B2 | 11/2015 | Zhang |
| 9,342,273 B1 | 5/2016 | Kumar et al. |
| 2009/0125902 A1 | 5/2009 | Ghosh et al. |
| 2011/0047613 A1 | 2/2011 | Walsh |
| 2011/0113467 A1 | 5/2011 | Agarwal et al. |
| 2015/0309849 A1 | 10/2015 | Lau et al. |
| 2016/0170651 A1* | 6/2016 | Liang ............... G06F 17/30 711/171 |
| 2016/0196426 A1 | 7/2016 | Hunt et al. |
| 2016/0248785 A1 | 8/2016 | Petry et al. |

OTHER PUBLICATIONS

"Anonymizing your MAC Address| Qubes OS Project", Retrieved from <<http://web.archive.org/web/20160817115513/http://www.qubes-os.org/doc/anonymizing-your-mac-address>>, Jan. 16, 2018, 3 Pages.

"International Search Report and Written Opinion Issued in PCT Application No. PCT/US2017/060260", dated Jan. 25, 2018, 11 Pages.

Rutkowska, et al., "Qubes OS Architecture", In Invisible Things Lab Technical Report 54, Jan. 1, 2010, 44 Pages.

* cited by examiner

ANONYMOUS CONTAINERS

RELATED APPLICATIONS

This application claims priority under 35 U.S.C. Section 119(e) to U.S. Provisional Patent Application No. 62/421,254, filed Nov. 12, 2016 and titled "Anonymous Containers," the entire disclosure of which is hereby incorporated by reference.

BACKGROUND

We live in an age in which information and data defines us as people. For example, banking data defines our finances and tracks our assets, while government data tracks our tax information, our driver license, our court records, and so forth. Credit cards enable shopping online and at physical stores. Information about our health is stored by doctors, hospitals and pharmacies. Information supplements our communication, enabling sharing of voice, video and pictures. This seamless flow of information improves our lifestyle, creating a convenient environment to live and work.

However, this information should not be globally accessible, and in many cases, such information is unknowingly or illegitimately acquired or stolen. Information leaks (also known as information disclosure) are a key issue when using technology. Information leaks can result through several mechanisms, and can be either intentional or unintentional. Such examples include user action, in which a user inputs information to an application through a human-computer interface such as a keyboard. In addition, techniques such as social engineering may trick users into leaking information. In some cases, even legitimate applications access a user's information and leak this information, or use the information to create a digital "footprint" of the user. For example, in some cases, the user is not allowed to use an application until the user discloses personal information such as the user's current location. Or, the application may not operate properly unless the user provides such information to the application. In addition, malware or attack software can access information and then leak it, and many of these types of attacks go undetected by the user, and some sophisticated attacks may even go undetected by the operating system and anti-virus software. Additionally, computing device infections often occur when users browse the Internet to untrusted web sites or when they download or open untrusted network resources such as applications and documents. These infections allow attackers to steal the user's credentials or even take control of the computing device to repurpose it for the attacker's own means.

While one solution to combat these information attacks is to shut down network access to the computing device, this severely limits the functionality of many modern computing devices. Additionally, in a workplace environment, disabling network access hampers employee productivity and job satisfaction. As a compromise, many employers enable limited network access by preventing employees from accessing untrusted network resources. However, this limited network access results in increased administration costs for the employer as the employer must consistently update policy defining which network resources are untrusted. This can lead to frustration with the use of computing devices by both the users and the employer. Further, many legitimate applications which users would like to utilize on a regular basis may still access personal or sensitive information, and it can be difficult, therefore, to limit use of every type of application with network access.

SUMMARY

Anonymous containers are discussed herein. An operating system running on a computing device, also referred to herein as a host operating system running on a host device, prevents an application from accessing personal information (e.g., user information or corporate information) by activating an anonymous container that is isolated from the host operating system. In order to create and activate the anonymous container, a container manager anonymizes the configuration and settings data of the host operating system, and injects the anonymous configuration and settings data into the anonymous container. Such anonymous configuration and settings data may include, by way of example and not limitation, application data, machine configuration data, and user settings data. The host operating system then allows the application to run in the anonymous container.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
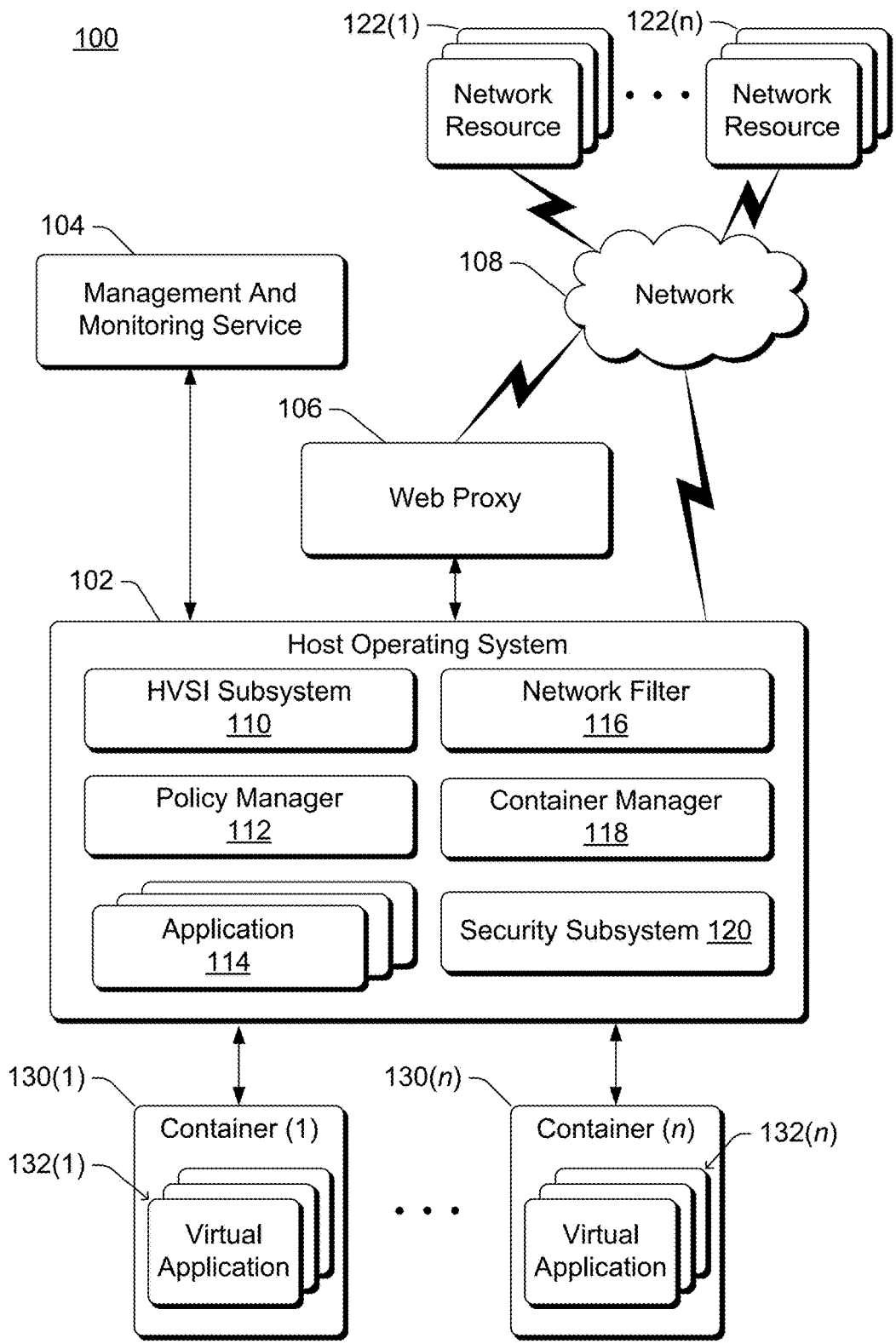
FIG. 1 illustrates an example system implementing anonymous containers in accordance with one or more embodiments.

Anonymous containers are discussed herein. An operating system running on a computing device, also referred to herein as a host operating system running on a host device, prevents an application from accessing personal information (e.g., user information or corporate information) by activating an anonymous container that is isolated from the host operating system.

In order to create and activate the anonymous container, a container manager anonymizes the configuration and settings data of the host operating system, and injects the anonymous configuration and settings data into the anonymous container. Such anonymous configuration and settings data may include, by way of example and not limitation, application data, machine configuration data, and user settings data.

In some cases, the container manager generates the anonymous container with a "pristine" configuration that is created from a pre-installed version of the host operating system. Doing so, makes it appear to the application as though it is interacting with an operating system that has never been used. Alternately or additionally, the container manager can be implemented to "randomize" the anonymous configuration and setting data in order to cause the anonymous container to appear, to an application, malware, or attack software, as a random user's computing device. Alternately or additionally, the container manager can be implemented to "spoof" the anonymous configuration and settings data with information that intentionally misleads the application, malware, or attack software. For example, the container manager may generate the anonymous configuration and settings data to indicate that the anonymous container is in Tokyo, Japan, while the host operating system is actually in New York.

The host operating system then allows the application to run in the anonymous container. The application is able to function normally by being able to access the anonymous configuration and settings data, but because the data corresponds to a pristine operating system, random data, or spoofed data, the application is unable to access personal information of the user or enterprise.

In accordance with one or more aspects, the host operating system is configured to terminate or suspend the anonymous container for a variety of different reasons, such as an operating system servicing event or an application update. The host operating system can then regenerate the anonymous container with the same anonymous configuration and settings data.

As an example of the described techniques, consider a user who uses a web browser to navigate to a social networking website such as Facebook. Currently, such a social networking website may ask the user for the user's location, and the user usually provides this information, such as by allowing the application to access their GPS location. Now, however, the web browser is launched in anonymous container, and thus the web browser will have access to anonymous configuration and settings data. For example, the anonymous configuration and settings data may indicate that the user's location is in Tokyo, while in fact the user is actually in New York. Thus, if the social networking website asks for the user's location, the website will be provided with this spoofed location that does not correspond to the user's actual location. Furthermore, if the web browser ends up navigating to a website that includes malware or attack software, the malware or attack software is only able to access the anonymous configuration and settings data, and thus cannot steal the user's personal information. Further, the web browser, malware, or attack software can easily be terminated, in the event that the container becomes infected, by simply suspending, pausing and/or stopping the anonymous container.

However, if the container is suspended to terminate malware, or in response to a servicing event, the anonymous container can be easily deleted and regenerated the next time that the web browser is launched. For example, the next time that the user launches the web browser, the container manager injects the same anonymous configuration and settings data that was injected into the original anonymous container. For example, the container manager may inject the same location information that indicates the user is in Tokyo, even though the user is still in New York.

FIG. 1 illustrates an example system 100 implementing anonymous containers in accordance with one or more embodiments. System 100 is implemented at least in part by a host device. Any of a variety of different types of computing devices can be used to implement the system 100, such as a server computer, a desktop computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, virtual reality glasses or headset, augmented reality headset or glasses), an entertainment device (e.g., an entertainment appliance, a set-top box communicatively coupled to a display device, a game console), an Internet of Things (IoT) device (e.g., objects or things with software, firmware, and/or hardware to allow communication with other devices), a television or other display device, an automotive computer, and so forth. Thus, the computing device implementing system 100 may range from a full resource device with substantial memory and processor resources (e.g., personal computers, game consoles) to a low-resource device with limited memory and/or processing resources (e.g., traditional set-top boxes, hand-held game consoles).

The system 100 includes a host operating system 102, a management and monitoring service 104, and a web proxy 106. The management and monitoring service 104 is representative of a service that provides one or more administrative policies for the computing device implementing the host operating system 102, as discussed herein. The web proxy 106 is representative of functionality that controls access to one or more network resources 122(1), . . . , 122(m) accessed remotely from the computing device implementing the host operating system 102. For example, in one or more embodiments web proxy 106 controls access to one or more resources accessed from network 108 by requiring authentication from host operating system 102, as discussed in further detail below. Alternatively, in one or more embodiments the computing device implementing host operating system 102 accesses network resources via network 108 independent of a web proxy. Network 108 represents functionality of a data network, such as the Internet, a local area network (LAN), a public telephone network, an intranet, other public and/or proprietary networks, combinations thereof, and so forth. As such, network resources 122(1), . . . , 122(m) accessed via network 108 may include web sites, web applications, emails, documents, and so on.

In one or more embodiments, the host operating system 102, management and monitoring service 104, and web proxy 106 are implemented as part of the same computing device. Alternatively, at least part of the management and monitoring service 104 and/or web proxy 106 can be implemented on a device that is separate and remote from the device implementing the host operating system 102. For example, in one or more embodiments the management and monitoring service 104 is implemented as a mobile device management (MDM) service located remotely from a computing device implementing host operating system 102. Alternatively or additionally, the management and monitoring service 104 may be implemented as a lightweight directory access protocol (LDAP) server located remotely from a computing device implementing host operating system 102. Similarly, the web proxy 106 may be implemented remotely from the device implementing the host operating system 102.

The management and monitoring service 104 is configured to provide (e.g., push) policy to the host operating system 102. In one or more embodiments, the management and monitoring service 104 is configured to push policy to the host operating system 102 at regular intervals, such as at system startup, daily, and so on. Alternatively, the management and monitoring service 104 may be configured to push policy to the host operating system 102 whenever there is an update to policy for the host operating system. Although reference is made herein to policy being pushed to the host operating system 102, management and monitoring service 104 is configured to provide policy to host operating system 102 via any suitable data transmission methods (e.g., streaming). Alternatively, in one or more embodiments host operating system 102 is configured to obtain (e.g., pull) policy from the management and monitoring service 104. The management and monitoring service 104 has two roles. First, the management and monitoring service 104 receives an administrative configuration for individual network resources 122(1), . . . , 122(m) that are generally accessible to a user of the host operating system 102. In one or more embodiments, these network resources are associated with individual levels of trust. For example, an employer may define any network resource that is associated with the employer's website as having a high level of trust. Accordingly, policy for the host operating system 102 indicates that any network resources associated with the employer's website are trusted network resources. The second role of the management and monitoring service 104 is to receive feedback from the host operating system 102 regarding monitored activity associated with individual network resources and to compile that monitored information into a report for an administrator. This compiled report may be used by an administrator to update policy pertaining to trusted network resources for the host operating system 102.

The management and monitoring service 104 may be configured to receive policy configuration data from an administrator of the device that implements the host operating system 102. As discussed herein, policy describes information pertaining to trusted network resources such as trusted websites, trusted network locations, trusted networks, and so on. When the management and monitoring service 104 receives policy from an administrator, the management and monitoring service 104 is configured to send a policy update to a target set of computing devices. The target set of computing devices to which the management and monitoring service 104 sends policy updates is defined by an administrator in accordance with one or more embodiments. For example, in an enterprise environment as discussed above, the management and monitoring service 104 is configured to send policy updates to each computing device associated with the enterprise. Each computing device that receives a policy update is configured to locally store the policy for use when attempting to access network resources.

As discussed in further detail below, the computing device that implements host operating system 102 is configured to dynamically monitor activity associated with accessed network resources 122(1), . . . , 122(m). Monitored activity associated with network resources is updated locally at the host operating system 102 and communicated back to the management and monitoring service 104. In this manner, the management and monitoring service 104 may be continuously updated to provide a user of the host operating system 102 with an accurate list of trusted network resources.

The host operating system 102 also includes a hardware-based virtualized security isolation (HVSI) subsystem 110, a policy manager 112, one or more applications 114, a network filter 116, a container manager 118, and a security subsystem 120. The host operating system 102 also manages one or more containers, illustrated as multiple (n) containers 130(1), . . . , 130(n).

HVSI subsystem 110 is representative of functionality for calling network isolation query application programming interfaces (APIs) to determine if a requested network resource is trusted. These network isolation query APIs are exposed by, for example, the policy manager 112. If HVSI subsystem 110 determines that a requested network resource is trusted, HVSI subsystem 110 allows the requested network resource to be accessed by the host operating system 102. Alternatively, if HVSI subsystem 110 determines that a requested network resource is not trusted, HVSI subsystem 110 causes the host operating system 102 to activate one or more of containers 130(1), . . . , 130(n) and allow the one or more activated containers to access the untrusted network resource. In one or more implementations, an anonymous container 130 is activated for an application regardless of whether or not the application is trusted. Activation of anonymous containers is discussed in more detail below in the section titled "Anonymous Containers". Functionality of the HVSI subsystem 110 will be discussed in further detail below. In accordance with one or more embodiments, HVSI subsystem 110 determines whether a requested network resource is trusted by communicating with policy manager 112.

The policy manager 112 is representative of functionality for obtaining and storing one or more policies for the computing device implementing the host operating system 102. For example, in one or more embodiments a policy manager 112 obtains and stores one or more administrative policies that define one or more trusted network resources for the host operating system 102. In accordance with one or more implementations, a policy manager 112 obtains and stores administrative policies from the management and monitoring service 104. Alternatively or additionally, policy manager 112 obtains and stores one or more administrative policies from a remote source, such as from network 108. Additionally or alternatively, policy manager 112 receives and stores one or more administrative policies from a user of the device implementing host operating system 102.

Applications 114 include one or more applications that are executable by one or more processors of the computing device implementing the host operating system 102. For example, applications 114 may include a web browser application. Alternatively or additionally, applications 114 may include applications such as e-mail applications, word processing applications, spreadsheet applications, visual presentation applications, "apps" for mobile devices, and the like.

The network filter 116 is representative of functionality for connecting the device implementing host operating system 102 to a network, such as network 108. Network filter 116 includes at least one physical network interface card and at least one host virtual network interface card. Network filter 116 additionally includes a filter driver, which is configured to intercept requested network resources as they are transmitted from the network 108 to the host operating system 102. These intercepted network resources are then compared by the HVSI subsystem 110 against one or more policies stored in policy manager 112. In this manner, network filter 116 ensures that the host operating system 102 is prevented from accessing any untrusted network resources. Similarly, network filter 116 ensures that one or more of containers 130(1), ..., 130(n) are unable to access any trusted network resources. For example, in one or more embodiments network filter 116 is configured to change data associated with individual packets of a trusted network resource to ensure that the trusted network resource is accessed only by the host operating system 102 and is prevented from being accessed by any of the one or more of containers 130(1), ..., 130(n).

The host operating system 102 additionally includes a container manager 118. The container manager 118 manages the scheduling of containers 130(1), ..., 130(n) in the system 100 and determines which containers 130(1), ..., 130(n) are run on the host operating system 102 at what times. Container manager 118 is also responsible for activating one or more containers 130(1), ..., 130(n) for an individual user of the system 100 and for ensuring that other users of the system 100 cannot access the one or more containers 130(1), ..., 130(n) created for the individual user. Container manager 118 is also configured to collect logs and traces from any one or more created containers 130(1), ..., 130(n) for telemetry and security indicators. For example, in one or more embodiments, container manager 118 consults anti-virus applications installed on the host operating system 102 to interpret collected information and provides monitored data to the HVSI subsystem 110. Depending on the number of physical processors and/or processor cores in the computing device running the host operating system 102, a single container 130(1), ..., 130(n) can be run at a time (e.g., in the case of a single processor with a single core) or alternatively multiple containers 130(1), ..., 130(n) can be run concurrently (e.g., in the case of multiple processors and/or multiple processor cores). Additionally, in one or more embodiments container manager 118 is configured to monitor user configuration changes that are performed within one or more of containers 130(1), ..., 130(n). For example, container manager 118 is configured to detect changes to user preferences associated with a web site accessed in one of containers 130(1), ..., 130(n). Host operating system 102 is configured to use these detected changes in the container and apply them to one or more related web sites that are accessed in the host operating system. Additionally, in one or more embodiments, container manager 118 is configured to activate an anonymous container 130 for an application, regardless of whether or not the application is trusted.

Security subsystem 120 is representative of functionality for enforcing security policy on the host operating system 102. Security subsystem 120 is configured to verify a user logging on to a device implementing the host operating system 102, handle password changes for the logged on user, create access tokens for a logged on user, and so on.

Each container 130(1), ..., 130(n) can be implemented in different manners. One type of container that a container 130 can be implemented as is referred to as a process container. For a process container, the application processes within the container run as if they were operating on their own individual system (e.g., computing device), which is accomplished using namespace isolation. Host operation system 102 implements namespace isolation. Namespace isolation provides processes in a container a composed view consisting of the shared parts of host operating system 102 and the isolated parts of the operating system that are specific to each container such as filesystem, configuration, network, and so forth.

Another type of container that a container 130 can be implemented as is referred to as a virtualized container. For a virtualized container, the virtualized container is run in a lightweight virtual machine that, rather than having specific host physical memory assigned to the virtual machine, has virtual address backed memory pages. Thus, the memory pages assigned to the virtual machine can be swapped out to a page file. The use of a lightweight virtual machine provides additional security and isolation between processes running in a container. Thus, whereas process containers use process isolation or silo-based process isolation to achieve their containment, virtualized containers use virtual machine based protection to achieve a higher level of isolation beyond what a normal process boundary can provide. A container may also be run in a virtual machine using physical memory.

In one or more embodiments, each container 130(1), ..., 130(n) includes one or more virtual applications 132(1), ..., 132(n). Individual ones of the one or more virtual applications 132(1), ..., 132(n) correspond to instances of individual ones of the applications 114 on host operating system 102. Virtual applications 132(1), ..., 132(n) are thus useable to access untrusted network resources in one or more of containers 130(1), ..., 130(n) in a similar manner to how one of applications 114 would access a trusted network resource on the host operating system 102.

Having considered an example system for implementing anonymous containers, consider now an example architecture for the system implementing hardware-based virtualized security isolation in accordance with one or more embodiments.

Figure 2:
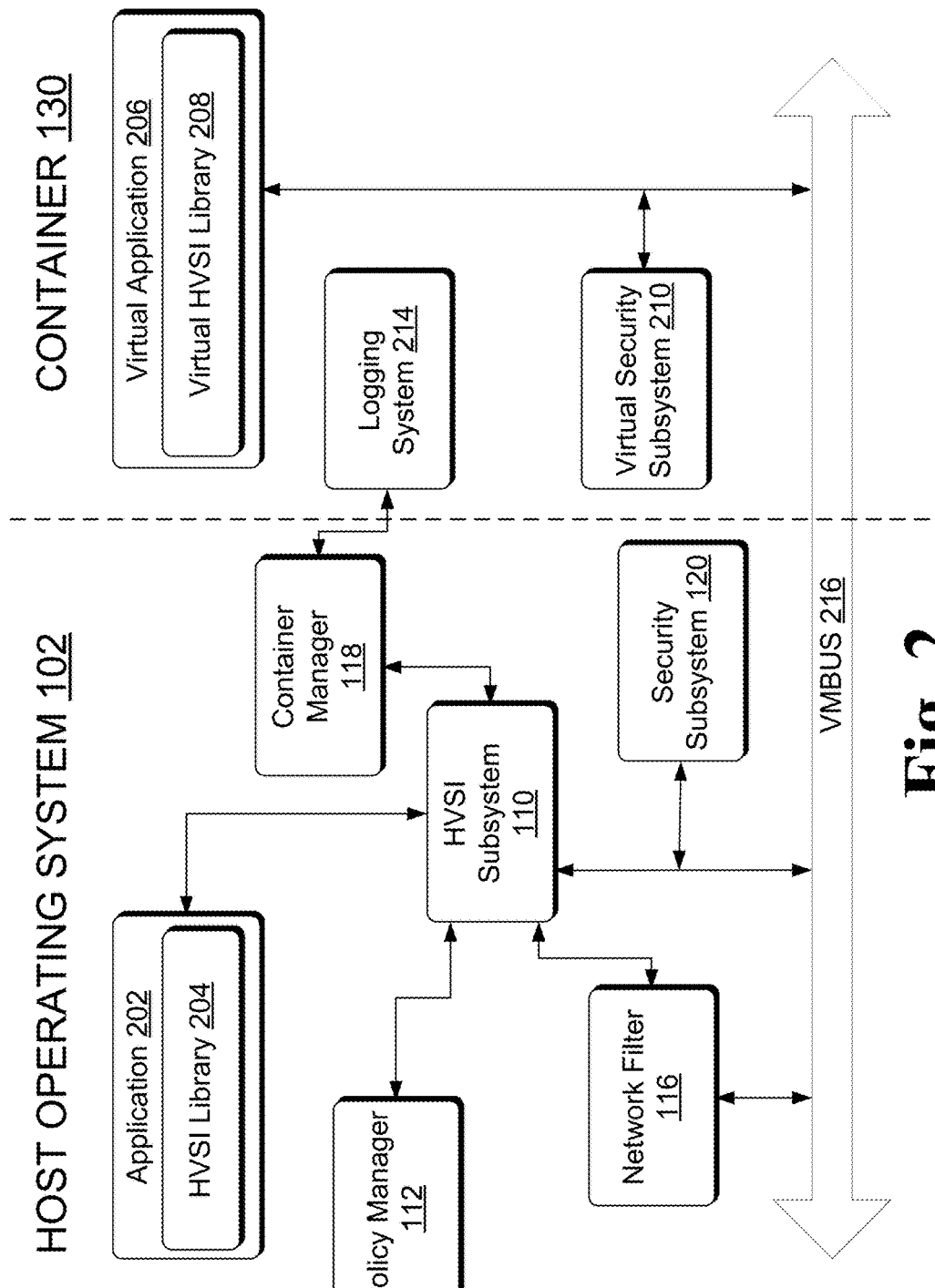
FIG. 2 illustrates an example system architecture for implementing anonymous containers in accordance with one or more embodiments.

FIG. 2 illustrates an example system architecture 200 for anonymous containers in accordance with one or more embodiments. Although discussed herein as hardware-based virtualized security isolation, it is to be appreciated and understood that the techniques discussed herein may also be referred to as virtualization based isolation (VBI). System architecture 200 is implemented at least in part by a computing device. Any of a variety of different types of computing devices can be used to implement the system architecture 200, analogous to the discussion above regarding types of that can be used to implement the system 100 of FIG. 1.

In the illustrated example, the computing device implementing the system architecture 200 includes the host operating system 102 and the container 130. The host operating system 102 is isolated from any one or more containers 130 to protect the host operating system from attacks or infections that may result from untrusted network resources.

The host operating system 102 is illustrated as including HVSI subsystem 110, policy manager 112, network filter 116, container manager 118, and security subsystem 120. Additionally, the host operating system 102 includes application 202, which may be one of applications 114 illustrated in FIG. 1. Application 202 includes HVSI library 204, the functionality of which will be discussed in further detail below.

The container 130 includes virtual application 206, which is representative of an instance of application 202 included in host operating system 102. The container 130 additionally includes a virtual security subsystem 210, the functionality of which is discussed in further detail below. Additionally, the container 130 includes a logging system 214, which is representative of functionality of content manager 118 to manage and monitor network resource activity within one or more containers 130 activated by the device implementing system architecture 200.

The host operating system 102 and the container 130, although isolated from one another, are communicatively connected via virtual machine bus 216. Virtual machine bus 216 is a communication channel that allows the host and container portions to communicate with one another. Additionally or alternatively, the host operating system 102 and the container 130 are communicatively connected via other means such as a physical network, a virtual network, simple message block (SMB) protocol, or remote procedure call (RPC) interconnections.

Having considered a system architecture for a system implementing hardware-based virtualized security isolation, consider now functionality of individual components illustrated in the host portion and the container portion of system architecture 200.

HVSI Subsystem

HVSI subsystem 110 is representative of functionality for implementing hardware-based virtualized security isolation in the computing device implementing system architecture 200. In order to implement hardware-based virtualized security isolation, HVSI subsystem 110 is configured to communicate with the policy manager 112, the network filter 116, the container manager 118, security subsystem 120, application 202, and any one or more containers 130. In one or more embodiments, HVSI subsystem 110 is automatically launched upon startup of the computing device implementing system architecture 200. Alternatively, HVSI subsystem 110 is launched at other times, such as by HVSI library 204 of application 202 when the application 202 is launched by the host operating system.

When HVSI subsystem 110 is launched, it calls container manager 118 to create a container for a user logged on to the computing device implementing system architecture 200, if a container for the user does not already exist. The container manager 118 will create a random or pseudo-random unique local account credential to use to connect to the container. This local account credential is known only to the host operating system 102 and is used to connect the host operating system 102 to the container. A transaction of the local account credential between the host operating system 102 and the container is transparent to a user of host operating system 102 and prevents malicious attacks or infections from connecting to the container over the host operating system 102's physical network Internet connection. In embodiments where host operating system 102 has multiple users, container manager 118 is configured to create separate containers for individual users. Each separate container has a different random or pseudo-random unique local account credential such that host operating system 102 is restricted from accessing any containers that were not created for a logged-on user. Container manager 118 ensures this container separation by authenticating associated user credentials before permitting accesses to one or more containers. Note that in some embodiments, the user data is settable by policy. For example, the username may be something that is spoofed to look to applications as if it is a real name. In some embodiments, the user information is saved and re-used with new containers to ensure that the user looks consistent to the applications.

HVSI subsystem 110 then instructs container manager 118 to suspend the container until HVSI subsystem 110 detects that an application running on the computing device implementing system architecture 200 is attempting to access one or more untrusted network resources. HVSI subsystem 110 is configured to monitor communications between the host operating system and one or more remote resource locations based on information provided to HVSI subsystem 110 by network filter 116.

When host operating system 102 attempts to access a network resource, HVSI subsystem 110 communicates with the policy manager 112 to determine if the requested network resource is a trusted network resource. If HVSI subsystem 110 determines that the requested network resource is a trusted network resource, HVSI subsystem 110 permits the trusted network resource to be accessed by an application in host operating system 102, such as application 202. Information associated with a network resource that HVSI subsystem 110 may use to determine if the network resource is trusted includes, file type, application type, results of an anti-virus scan of the network resource, a virus signature, email source information, document metadata, URLs, IP addresses, TCP ports, DNS name, hardware device identifiers, or combinations thereof. For example, if HVSI subsystem 110 ascertains that application 202 is requesting to navigate to a particular web page, HVSI subsystem 110 compares information associated with the particular web page with one or more policies from the policy manager 112 and permits the application 202 to access the particular web page in response to determining that the particular web page is trusted. HVSI subsystem 110 determines that the particular web page is trusted, for example, based on one or more of the particular web page's fully qualified domain name (FQDN), root site domain name utilizing the domain name server (DNS), internet protocol (IP) address, or similar uniform resource locator (URL) addressing method. In accordance with one or more embodiments, HVSI subsystem 110 is additionally configured to determine if a network resource is trusted by receiving information from a cloud-based service implemented remotely from computing device 102 that maintains a list of malicious network resources. For example, if HVSI subsystem 110 ascertains that application 202 is requesting to navigate to a particular web page, HVSI subsystem 110 consults a cloud-based service via network 108 to compare the particular web page against a list of potentially malicious network resources stored at the cloud-based service. If the cloud-based service indicates that the particular web site is included in the list of potentially malicious network resources, the particular web page is determined to be untrusted.

Alternatively, if HVSI subsystem 110 determines that a requested network resource is not a trusted network resource, HVSI subsystem 110 causes container manager 118 to activate container 130 to handle the untrusted network resource. Based on the type of application that is requesting the untrusted network resource in the host system, HVSI subsystem 110 instructs the container manager 118 to launch a virtual version of the application within container 130. For example, if HVSI subsystem 110 determines that application 202 is requesting access to an untrusted network resource, HVSI subsystem 110 instructs container manager 118 to create the virtual application 206 within container 130. In this manner, container 130 is configured to interact with one or more untrusted network resources just as the host operating system 102 would interact with one or more trusted network resources. In one or more embodiments, container 130 is activated by and implemented on the device implementing host operating system 102. Alternatively, container 130 is activated by and implemented on a device that is different from the device implementing host operating system 102. Alternatively, container 130 is implemented by a device that is different from the device implementing operating system 102 but is activated by the device implementing host operating system 102.

In order for a user of the computing device implementing host operating system 102 to view and otherwise interact with any one or more untrusted network resources that are accessed by a virtual application within container 130, HVSI subsystem 110 is configured to communicate with container 130 to cause display of an interface for the virtual application 206. For example, in one or more embodiments HVSI subsystem 110 uses a remote applications integrated locally (RAIL) mode of a remote desktop protocol (RDP) using virtual machine bus 216. In this manner, host operating system 102 may display an interface of virtual application 206 at a display device of the device implementing host operating system 102. In one or more embodiments, the interface is configured so that a user of host operating system 102 perceives the interface to be part of the host operating system itself. Alternatively, HVSI subsystem 110 is configured to display an interface corresponding to virtual application 206 with a visual indication that the displayed interface corresponds to one or more untrusted network resources. In other embodiments, the HVSI subsystem 110 uses an X Window System or an alternative remote desktop implementation to display an interface corresponding to virtual application 206.

After container 130 is activated by container manager 118, network filter 116 filters all network resource calls from host operating system 102 and container 130. For example, HVSI subsystem 110 instructs network filter 116 to block all calls to untrusted network resources from host operating system 102 and allow only trusted network resource calls from host operating system 102. Similarly, HVSI subsystem 110 instructs network filter 116 to allow all calls to untrusted network resources from container 130 and block all calls to trusted network resources from container 130.

HVSI subsystem 110 is configured to instruct container manager 118 to monitor all activity associated with untrusted network resources that are accessed by container 130. When HVSI subsystem 110 receives an indication from container manager 118 that all instances of virtual applications 206 running in container 130 are terminated, HVSI subsystem 110 terminates any connection between host operating system 102 and any containers 130 being accessed by host operating system 102. HVSI subsystem 110 will then either suspend or terminate the one or more containers 130. For example, in one or more embodiments when HVSI subsystem 110 ascertains that processing of virtual application 206 has ended, HVSI subsystem 110 terminates a connection with container 130 and suspends the container to wait for further requests for untrusted network resources. Alternatively, if HVSI subsystem 110 determines that a user has logged off the device implementing system architecture 200, HVSI subsystem 110 terminates any one or more containers 130 that were activated by host operating system 102.

By communicating with components of host operating system 102, such as policy manager 112, network filter 116, container manager 118, and security subsystem 120, HVSI subsystem 110 is configured to determine if a requested network resource is trusted, restrict opening of the untrusted network resources to an isolated container, and manage one or more processes running within the isolated container. This allows HVSI subsystem 110 to perform hardware-based virtualized security isolation techniques in order to protect the device implementing host operating system 102 from kernel level attacks or infections that may be caused by untrusted network resources.

Having considered an example system architecture of a host operating system that performs hardware-based virtualized security isolation, consider now individual components of a host operating system in accordance with one or more embodiments.

Policy Manager

Policy manager 112 represents functionality of host operating system 102 for obtaining and storing one or more policies for a computing device implementing the host operating system. For example, policy manager 112 is configured to obtain and store one or more policies from the management and monitoring service 104 illustrated in FIG. 1. Each of the one or more policies specifies one or more trusted network resources that host operating system 102 is allowed to access. Additionally, a policy may specify one or more policy objects and one or more corresponding security parameters for the policy object. These policy objects and corresponding security parameters provide constraints defining how the host operating system may interact with one or more untrusted network resources.

For example, a policy object may identify whether host operating system 102 is allowed to implement virtual applications in isolated containers, such as container 130. If the corresponding security parameter for this policy object indicates that host operating system 102 is allowed to implement virtual applications and isolated containers, then the host operating system may open one or more untrusted network resources in virtual application 206 of isolated container 130. Alternatively or additionally, a policy object indicates certain virtual applications that are allowed to open in an isolated container. The corresponding security parameter for this policy object may identify one or more specific applications that are allowed to be virtually opened in an isolated container. Alternatively or additionally, a policy object indicates what host operating system 102 may copy between isolated container 130 and host operating system 102 itself. The corresponding security parameter specifies one or more file types that may be copied in between isolated container 130 and host operating system 102. Alternatively or additionally, a policy object indicates print settings for virtual applications opened in isolated container 130. The corresponding security parameter for this policy object indicates whether virtual application 206 running in isolated container 130 may print and, if so, one or more printers, applications, or file types to which virtual application 206 is allowed to print. Alternatively or additionally, a policy object indicates whether network traffic for virtual application 206 is allowed. The corresponding security parameter for this policy object may specify one or more virtual applications for which network traffic is allowed within an isolated container. Alternatively or additionally, a policy object indicates whether background tasks for virtual application 206 are allowed. The corresponding security parameter specifies one or more virtual applications for which background tasks are allowed within isolated container 130. Alternatively or additionally, a policy object indicates whether the virtual application 206 running in the container is allowed to leverage one or more hardware resources of the computing device implementing host operating system 102, such as the computing device's GPU for graphics acceleration.

The following table provides an example set of policy objects and corresponding security parameters, such as those discussed above. In accordance with standard security procedures, this example policy has a default deny rule implied, which is not illustrated. It is to be appreciated and understood however, that the discussed policy objects and corresponding security parameters are exemplary and not exhaustive in scope.

| Policy Object | Security Parameter |
| --- | --- |
| Allow Virtual Application Isolation in Container? | Yes |
| Virtual Applications for Container Isolation | Web browser, Notepad, Word processing application, email application. |
| Clipboard Settings | Text and Images Allowed |
| Print Settings | Printer 1; Print to PDF; Print to XPS |
| Network Traffic for Virtual Isolated Applications? | Enabled for web browser |
| Background Tasks for Virtual Isolated Applications? | Enabled for email application |

When host operating system 102 starts up, HVSI subsystem 110 contacts policy manager 112 to obtain a list of trusted network resources for the host operating system, along with any policy objects and corresponding security parameters. HVSI subsystem 110 aggregates these trusted network resources, policy objects, and corresponding security parameters and applies this aggregated policy to host operating system 102. In one or more embodiments, this aggregated policy is queried each time host operating system 102 requests to perform an action or attempts to access a network resource. For example, when host operating system 102 requests to open application 202 that is included in the security parameter corresponding to the policy object "Virtual Applications for Container Isolation", HVSI subsystem 110 causes host operating system 102 to open a virtual version of that application 206 in isolated container 130.

HVSI subsystem 110 is additionally configured to monitor activity within one or more of isolated container(s) 130 to ensure that the container(s) do not gain access to any trusted network resources. For example, if a virtual version of a web browser is running in isolated container 130, and HVSI subsystem 110 detects that the virtual web browser is attempting to access a network resource that is indicated by the policy manager 112 as a trusted network resource, HVSI subsystem 110 may prevent the virtual web browser from opening or otherwise accessing this trusted network resource and instead cause the trusted network resource to be opened within a corresponding web browser on host operating system 102. By restricting access and opening of trusted network resources to host operating system 102 and restricting access and opening of untrusted network resources to one or more isolated containers 130, HVSI subsystem 110 ensures that trusted network resources are not corrupted by any untrusted network resources.

In addition to receiving the list of trusted network resources, policy objects, and corresponding security parameters from the policy manager 112, host operating system 102 is configured to observe one or more local events that could impact policy for the host operating system. For example, consider a scenario where a virtual web browser is running within isolated container 130. HVSI subsystem 110 monitors the behavior of each network resource accessed by the virtual web browser within isolated container 130. When the virtual web application navigates to an untrusted network resource, downloading the untrusted network resource may cause a registry of container 130 to be written to in an unexpected manner. Using container manager 118, which is discussed in further detail below, HVSI subsystem 110 obtains data from container 130 and calculates an updated local policy for the untrusted network resource. For example, in one or more embodiments HVSI subsystem 110 updates local policy for the untrusted network resource by disabling printing and copying settings associated with the untrusted network resource. HVSI subsystem 110 is then configured to aggregate this obtained data and report the obtained data to a remote service, such as the management and monitoring service 104 illustrated in FIG. 1. In accordance with one or more embodiments, the HVSI subsystem 110 consults locally installed applications of host operating system 102, such as antivirus applications for additional information in updating this local policy. For example, HVSI subsystem 110 uses one or more antivirus applications to scan an untrusted network resource in container 130 and assign a security level to the untrusted network resource. In this manner, HVSI subsystem 110 is configured to continually update policy and further protect the computing device implementing host operating system 102 against untrusted network resources.

In one or more embodiments, HVSI subsystem 110 implements an independent host-based policy engine that responds to local activity at host operating system 102 and container 130. This independent host-based policy engine reduces round trips to the management and monitoring service 104, enabling the management and monitoring service to manage many clients. In one or more embodiments, policy manager 112 obtains a template or a signature from management and monitoring service 104. Policy manager 112 provides this template or signature to HVSI subsystem 110. When container 130 is activated, HVSI subsystem 110 computes the required policy based on a pattern from the policy template or signature that it matches to activity observed in container 130. For example, if a virtual web application is running in container 130, and a network resource the virtual web application is trying to access as a URL matches a pattern in the policy template, HVSI subsystem 110 calculates a risk level and updates the policy. This dynamically results in a specific action applied to the virtual application in container 130, such as an allow action, a block action, or a redirect action. In this embodiment, the policy is dynamic, offloading local assessment and policy from the management and monitoring service 104 to HVSI subsystem 110.

As an alternative example, consider a scenario where a user downloads and installs a new application from an untrusted web site within container 130. In this example, HVSI subsystem 110 assesses the downloaded application against existing policy, and calculates policy that applies to the downloaded application in isolated container 130. In one or more embodiments, this calculated policy is based on one or more policy objects and corresponding security parameters of similar applications. For example, if the downloaded application is an e-mail application, HVSI subsystem 110 identifies one or more policy objects and corresponding security parameters pertaining to other e-mail applications and applies similar policy settings for the downloaded e-mail application. HVSI subsystem 110 is configured to monitor activity associated with the downloaded application within container 130 and is configured to recalculate local policy based on this observed activity. Additionally or alternatively, information describing observed activity of any one or more downloaded applications or accessed network resources within container 130 is aggregated and communicated to a remote service, such as the management and monitoring service 104 illustrated in FIG. 1. In some embodiments, the host operating system 102 performs local analysis on the information describing observed activity within container 130 and calculates additional security policy. For example, if a downloaded application is exhibiting anomalous behavior, the downloaded application may be terminated and the container reset to its previous operational state prior to downloading the application. As discussed herein, anomalous behavior in the container refers to, for example, an indicator that is interpreted by HVSI subsystem 110 as an attempt to compromise a kernel or operating system of container 130.

In order to enforce policy for host operating system 102, HVSI subsystem 110 employs one or more network filters, such as network filter 116.

Network Filter

Network filter 116 is representative of functionality for intercepting and inspecting ingoing and outgoing network traffic for host operating system 102. Network filter 116 has enforcement functionality for network traffic including forwarding, blocking and/or modifying network traffic, among other capabilities. For example, network filter 116 is configured to intercept and inspect all network traffic and data communication in between host operating system 102 and any one or more isolated containers 130. Similarly, network filter 116 is configured to intercept and inspect all network traffic and data communication in between host operating system 102 and any remote resource locations accessed via network, such as network 108 illustrated in FIG. 1. In one or more embodiments, in order to interface host operating system 102 with any one or more isolated containers 130, network filter 116 includes a virtual switch, at least one network interface card for the host operating system, and one or more virtual network interface cards for the one or more isolated containers.

Using policy received from policy manager 112, HVSI subsystem 110 interfaces with network filter 116 to ensure that container 130 is not able to access trusted network resources. Similarly, HVSI subsystem 110 interfaces with network filter 116 to ensure that host operating system 102 is not able to access or otherwise open any one or more untrusted network resources. In one or more embodiments, network filter 116 is configured to change data of individual packets associated with trusted network resources to ensure the trusted data remains on host operating system 102 and does not flow to container 130. As discussed in further detail below, in a proxy authentication scenario, the network filter 116 injects credential information into network traffic to ensure proxy traversal and prevent credentials from leaking into or otherwise being accessed by the container. In some embodiments, the network filter 116 validates that network traffic is originating or terminating at a network resource that was queried during DNS lookup. To accomplish this, identifiers based on allowed network resources are plumbed inside the container and associated with one or more network resource names. A network stack in the container includes these identifiers in the network traffic. The network filter 116 validates whether an identifier matches a network resource name. If the validation is successful, the traffic is forwarded, if it fails, the traffic is dropped. In some embodiments, the network filter 116 strips the identifier from forwarded network traffic.

In accordance with one or more embodiments, network filter 116 is implemented as a virtual switch extension. Alternatively, network filter 116 is implemented as any module that has multiple abilities including to intercept, inspect, forward, modify, and block network traffic. In other embodiments the network filter is built into firewall or other security software of the computing device implementing host operating system 102. In accordance with one or more embodiments, network filter 116 is installed on host operating system 102 when policy is received at the host operating system. For example, network filter 116 may be installed when the policy manager 112 receives policy from the management and monitoring service 104 illustrated in FIG. 1. However, because network filter 116 requires resources (e.g., memory) of the device implementing host operating system 102, in one or more embodiments network filter 116 is not installed when there is no policy present on the host operating system. In this manner, when there is no policy to divert untrusted network resources to isolated containers, such as container 130, network filter 116 is not installed to reduce resource overhead.

In some embodiments, the network filter 116 enforces which network interface is used to connect to a resource. For example, while host operating system 102 is in an enterprise, security is assumed. In the enterprise, application 202 running on host operating system 102 may simply use any available physical interface (e.g. Ethernet, Wi-Fi, etc.). However, when the host operating system 102 is on a public network (e.g. outside the enterprise at a coffee shop's public Wi-Fi), the network filter 116 may only allow application 202 and other applications running on host operating system 102 to use a certain network interface, such as a VPN interface, improving network security. In some configurations, network filter 116 allows one or more applications running in container 130 to access the public network without using VPN. In embodiments where one network interface is isolated for host operating system 102 communications and a different network interface is isolated for container 130 communications, network filter 116 is configured to provide an indication to a network stack of container 130 that network communications for the container are isolated to the different network interface.

HVSI subsystem 110 calls network filter 116 and causes network filter 116 to attach itself to network ports of the device implementing host operating system 102. Once network filter 116 is attached to the network ports, it is able to monitor, filter, and/or block network traffic. In one or more embodiments, the network filter 116 includes a local DNS server to further enforce policy for host operating system 102. For example, in one or more embodiments network filter 116's DNS server maps network resources to corresponding IP addresses to verify an origin of individual network resources. In one or more implementations, the network filter 116 includes one or more input/output control systems (IOCTLs) that are configured to allow or block a network traffic for both host operating system 102 and any one or more containers 130. In other implementations this configuration is performed through an API, a file, or a command shell.

Network filter 116 is configured to monitor network traffic (e.g., HTTP traffic) to ensure that host operating system 102 and container 130 are not accessing network resources that are not allowed for the respective host operating system or container. In order to monitor HTTP traffic, network filter 116 performs HTTP header inspection with one or more web proxies facilitating network traffic between host operating system 102 and/or any one or more isolated containers 130, such as web proxy 106 illustrated in FIG. 1. Alternatively, in accordance with one or more embodiments, network filter 116 is configured to implement its own HTTP proxy.

To support network communication functions in proxied environments and across network changes, network filter 116 includes a network address translator (NAT). The NAT provides container 130 with a private network and a gateway to reach a network outside host operating system 102. In accordance with one or more embodiments, the NAT is configured to forward outside network proxy configuration and forward outside network change notifications to host operating system 102. For example, in one or more embodiments network filter 116 uses a NAT to forward network change notifications to host operating system 102 when a network connection status changes, such as when a Wi-Fi (IEEE 802.11) Network adapter leaves or enters range of a Wi-Fi Network. Additionally, network filter 116's NAT is configured to emulate an outside network identity to ensure that container 130 can identify different networks correctly. For example, the NAT can take the media access control (MAC) address of the host's external network gateway and re-use it as the private network gateway MAC address provided by NAT. This ensures that container 130's HTTP software will appropriately align the HTTP cache and ensure proxy discovery is not duplicated when reconnecting to the same network. By emulating an outside network identity, network filter 116's NAT significantly improves network reconnect performance and improve user experience for a user of host operating system 102. Additionally, network filter 116's NAT is configured to forward "low-power connected standby" settings to host operating system 102 for one or more virtual applications 206 that are running in one or more isolated containers, such as container 130. This enables host operating system 102 to keep alive any virtual applications 206 running in one or more active isolated containers 130. In one or more embodiments, functionality of the NAT is offloaded to a different component of host operating system 102. For example, provisioning a private network and gateway to reach a network outside host operating system 102, forwarding network change notifications, emulating an outside network identity, and forwarding low-power connected standby settings can be performed by one or a combination of network filter 116, HVSI subsystem 110, or container manager 118.

HVSI subsystem 110 is configured to interact with network filter 116 to perform web proxy authentication in accordance with one or more embodiments. For example, many enterprise systems use one or more web proxies to control Internet access for individual users of the enterprise. These web proxies require authentication before allowing individual users or applications to access network resources, such as web sites, by prompting user credentials such as a username and associated password. Accordingly, network filter 116 is configured to identify a web proxy that is required to facilitate access to a web site, such as web proxy 106 illustrated in FIG. 1. However, in scenarios where a virtual application running in an isolated container requires web proxy authentication, security concerns arise. For example, one or more untrusted network resources that are open and running in the isolated container 130 might gain unauthorized access to the user credentials and compromise security of associated user accounts.

In order to provide a seamless user experience for virtual applications 206 running in container 130 that require web proxy authentication, HVSI subsystem 110 is configured to provide user credentials to a web proxy from host operating system 102 without providing the user credentials to container 130. HVSI subsystem 110 is configured to provide user credentials to a web proxy for virtual application 206 running in container 130 by implementing virtual security subsystem 210 within the isolated container. Virtual security subsystem 210 is configured to interface with security subsystem 120 of host operating system 102. For example, in one or more embodiments HVSI subsystem 110 detects that virtual web application 206 is calling a network resource that requires web proxy authentication. HVSI subsystem 110 is configured to implement virtual security subsystem 210 within the isolated container so that the virtual security subsystem 210 can interface with security subsystem 120 of host operating system 102. Communication between virtual security subsystem 210 and security subsystem 120 may be performed over the connection established by HVSI subsystem 110, such as via virtual machine bus 216.

When virtual web application 206 in container 130 attempts to access a network resource via a web proxy, the web proxy returns with a challenge for user credentials. In this scenario, virtual security subsystem 210 is configured to call security subsystem 120 of host operating system 102 to provide authentication to the web proxy. In response to receiving this call, security subsystem 120 is configured to generate a dummy credential blob that indicates ownership of the user credentials without actually containing the user credentials within the credential blob. As discussed herein, a dummy blob may also be referred to as a pseudo-authentication of the user credentials. Security subsystem 120 returns the generated dummy credential blob to virtual security subsystem 210. Virtual security subsystem 210 then provides the dummy credential blob to virtual web application 206 so that the virtual web application can embed the dummy credential blob in an HTTP response to the web proxy. In this manner, container 130 is configured to prove ownership of user credentials without receiving the actual user credentials from host operating system 102. In accordance with one or more embodiments, proof of credential ownership within the dummy blob is performed by applying a hash security function to the actual credentials and including the hashed credentials within the dummy blob. This ensures that user credentials are not compromised by any untrusted network resources that may be running in container 130.

Alternatively, if virtual security subsystem 210 forwards a web proxy request for user credentials to security subsystem 120 of host operating system 102, security subsystem 120 is configured to generate two credential blobs. The first credential blob generated by security subsystem 120 is a dummy credential blob as described above. The second credential blob generated by security subsystem 120 contains the actual user credentials requested by the web proxy. In this scenario, the dummy credential blob is provided to the virtual security subsystem 210 in container 130, and the blob containing the actual user credentials is provided to network filter 116 in host operating system 102. As discussed above, virtual web application 206 is configured to receive the dummy credential blob from virtual security subsystem 210 and embed the dummy credential blob in an HTTP response to the web proxy. Because all network traffic from both host operating system 102 and container 130 are filtered through network filter 116, network filter 116 is configured to intercept the HTTP response from the container and replace the dummy blob with the actual user credential blob before transmitting the HTTP response to the web proxy. In accordance with one or more embodiments, where host operating system 102 is functioning in a nested computing environment, this credential blob replacement may be performed multiple times, at each layer of the nested environment. Alternatively, in one or more embodiments, network filter 116 plumbs allowed network resource identifiers within container 130 to validate that network traffic is originating and terminating at a network resource that was queried during DNS lookup, as discussed above.

When HVSI subsystem 110 determines that host operating system 102 is attempting to access an untrusted network resource, using policy manager 112, network filter 116, and security subsystem 110 as discussed herein, HVSI subsystem 110 communicates with container manager 118 to manage and monitor one or more containers 130 for accessing the untrusted network resource.

Container Manager

Container manager 118 is responsible for activating one or more containers 130 that are isolated from host operating system 102 to access untrusted network resources. As discussed herein, activating a container such as container 130 includes creating one or more new containers or resuming running of one or more suspended containers. In accordance with various implementations, container manager 118 is further configured to anonymize generation of the one or more containers 130, which is discussed in more detail below. Container manager 118 is additionally configured to activate one or more containers for an individual user logged into host operating system 102 and ensure that any other users of the host operating system are restricted from accessing the activated one or more containers for the individual user. Container manager 118 ensures a mapping of the user logged into host operating system 102 to the container 130. In some embodiments in which there are multiple users of host operating system 102 and multiple containers, the container manager 118 is configured to see a logged-on user's identity and directly associate that with one or more corresponding containers. This restriction prevents other users from viewing or otherwise interacting with the containers.

Container manager 118 is further configured to collect logs and traces describing activity within container 130. Container manager 118 is configured to use these logs and traces to monitor container usage for telemetry and security indicators. In accordance with one or more embodiments, container manager 118 consults with local applications installed on host operating system 102, such as an antivirus application, in order to interpret any security issues associated with monitored activity in container 130. Container manager 118 is configured to aggregate this monitored information and provide the monitored information to HVSI subsystem 110. Alternatively or additionally, container manager 118 is configured to provide this monitored information to one or more remote sources, such as management and monitoring service 104 illustrated in FIG. 1.

When host operating system 102 starts up, HVSI subsystem 110 determines whether policy is present. In one or more embodiments, HVSI subsystem 110 determines whether policy is present by communicating with policy manager 112, as discussed herein. If HVSI subsystem 110 determines that policy is present on host operating system 102, container manager 118 is configured to activate container 130 to handle any untrusted network resources that are requested by the host operating system. Container manager 118 is configured to activate container 130 by communicating with host operating system 102 to determine if a container base image exists. If container manager 118 determines that a container base image does not exist, container manager 118 is configured to create a container base image. If container manager 118 determines that a container base image does exist, or after container manager 118 creates a container base image, container manager 118 waits for a user to log onto host operating system 102.

A container base image contains information required to create and activate an isolated container that includes its own operating system, such as container 130. For example, in one or more embodiments a container base image contains information describing how host operating system 102 is to set registry settings for a container. Information regarding registry settings is required because some virtual applications that are opened inside container 130 behave differently than a version of the application that would be opened on host operating system 102. Additionally or alternatively, a container base image includes information describing how to create a user account within a virtual application executed in container 130. Additionally or alternatively, the container base image includes information regarding an amount of allocated resources, such as memory, processors, disks, or networks, which may be required by container 130 when active.

When a user logs onto host operating system 102, container manager 118 determines whether a container corresponding to the container base image exists. If container manager 118 determines that a container does not exist for the container base image, container manager 118 may create a container, such as container 130. To ensure that a container base image accurately represents the host operating system 102, container manager 118 is configured to invalidate any existing container base images and create one or more new container base images after an operating system update. In this manner, container manager 118 ensures that a container base image includes any updated host operating system binaries, thereby keeping containers created from the container base image up to date with the host operating system 102. In the event of a host operating system 102 update, container manager 118 is configured to either force close any open containers or wait until user activity in the container has ceased to delete the container base image and create a new container base image. After creating the container, container manager 118 places the container into a suspended mode. When a container is in a suspended mode, the container consumes fewer resources of the device implementing host operating system 102, thereby reducing resource overhead. Container manager 118 is configured to maintain one or more isolated containers 130 in a suspended mode until host operating system 102 requests access to one or more untrusted network resources.

When HVSI subsystem 110 detects that host operating system 102 is requesting access to one or more untrusted network resources, HVSI subsystem 110 instructs container manager 118 to activate one or more suspended containers in order to handle the one or more untrusted network resources. In one or more embodiments, the one or more containers are hosted on the computing device that is implementing host operating system 102. Alternatively, at least one of the one or more containers may be hosted on a computing device that is remote from the computing device implementing host operating system 102. In a scenario where a container is hosted on a different computing device, container manager 118 is configured to communicate with the different computing device to manage and monitor the remote containers. Because the container manager 118 can activate a suspended container faster than it can create a container, maintaining one or more suspended containers allows host operating system 102 to quickly respond to requests for untrusted network resources.

In response to determining that host operating system 102 is requesting access to one or more untrusted network resources, container manager 118 is configured to identify an application on the host operating system that is requesting the untrusted network resource. Container manager 118 is configured to launch a virtual version of the application within container 130 to handle the untrusted network resource. After container manager 118 activates a virtual version of the application within container 130, HVSI subsystem 110 is configured to remote into container 130 to display an interface of the virtual application at a display of the device implementing host operating system 102.

Container manager 118 is configured to communicate with HVSI subsystem 110 to ensure that appropriate hardware virtualization technology exists on host operating system 102, and in container 130, if the container is hosted by a remote computing device. For container manager 118 to function properly, the container manager 118 is configured to verify that host operating system 102's application programming interfaces (APIs) are available to manage isolated container lifecycles and associated network stacks.

Container manager 118 is configured to monitor activity within container 130 using logging system 214. In this manner, container manager 118 is configured to detect any suspicious behavior of a network or network resource that is accessed within container 130, whether container 130 is taking up too much disk space, and so on. Based on information obtained from logging system 214, container manager 118 is able to inform HVSI subsystem 110 how to manage one or more containers 130. For example, in one or more embodiments container manager 118 ascertains that access to one or more untrusted network resources within container 130 has completed and communicates this information to HVSI subsystem 110. In response to receiving this information, HVSI subsystem 110 places container 130 into a suspended mode until it is subsequently needed to handle an additional untrusted network resource.

Container manager 118 is also configured to monitor and determine when a user of host operating system 102 logs off. In response to determining that a user of host operating system 102 has logged off, container manager 118 provides this information to HVSI subsystem 110. HVSI subsystem 110 is configured to delete one or more containers 130 in response to the user logging off. As discussed herein, deleting a container also clears any information included within the container.

Container manager 118 is also configured to share DNS and Hypertext Transfer Protocol (HTTP) information from the host operating system 102 to improve web browsing performance or other network activity within the one or more of the isolated containers. In one or more embodiments, container manager 118 maintains a cache of DNS queries made from earlier instances where container 130 accessed network resources, as well as HTTP data such as Internet data files or web site cookies that enable future requests in a container to access untrusted web sites to remember one or more of previous user preferences, configurations, or settings.

In addition to receiving information regarding monitored activity within container 130 from container manager 118, HVSI subsystem 110 is also configured to receive information regarding container activity from one or more HVSI libraries 208.

HVSI Library

As discussed herein, an HVSI library is a small, lightweight, asynchronous library, which is configured to be linked either statically or dynamically within an application. For example, in the illustrated system architecture 200 of FIG. 2, application 202 includes HVSI library 204 and virtual application 206 includes virtual HVSI library 208. Each HVSI library is configured to run inside its respective application and is responsible for intercepting and forwarding network resource calls from the application to HVSI subsystem 110.

When a user of host operating system 102 attempts to open a network resource via application 202, HVSI library 204 communicates information regarding the requested network resource to HVSI subsystem 110. HVSI subsystem 110 compares this information against one or more policies obtained from policy manager 112 to determine whether the requested network resource is a trusted network resource. If HVSI subsystem 110 determines that the requested network resource is a trusted network resource, HVSI subsystem 110 allows application 202 to access the requested network resource. Alternatively, if HVSI subsystem 110 determines that the requested network resource is not a trusted network resource, HVSI subsystem 110 forwards the untrusted network resource to virtual application 206 in container 130.

Virtual HVSI library 208 in container 130 is configured to intercept network resource requests from virtual application 206 and communicate information regarding the requested network resources to HVSI subsystem 110. HVSI subsystem 110 is similarly configured to compare this information against any policies for host operating system 102 to ensure that no trusted network resources are provided to container 130. In one or more embodiments, a virtual application will not link to virtual HVSI library 208 to ensure compatibility. In these embodiments, logging system 214 and network filter 116 operate to intercept network resource requests from the virtual application and communicate information regarding the requested network resources to HVSI subsystem 110.

Having considered a system architecture for a system implementing hardware-based virtualized security isolation to protect a computing device from attacks or infections associated with untrusted network resources, consider now example procedures in accordance with one or more embodiments.

Anonymous Containers

In one or more implementations, container manager 118 is configured to anonymize the container 130 so that applications are unable to access sensitive information, such as personal or corporate information. For example, a corporation or business may define a policy that causes all applications to be launched in an anonymous container so that the applications are unable to access, or collect sensitive information. At the same time, the anonymous container is generated in such a way that the application is able to function normally.

Figure 3:
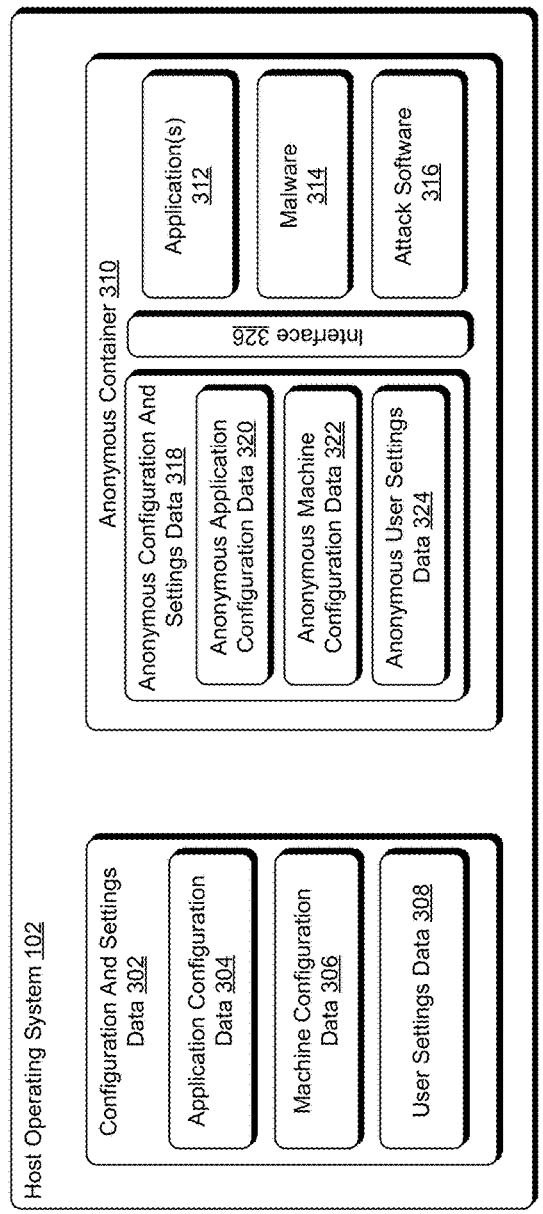
FIG. 3 illustrates an example environment in which an anonymous container can be generated.

As an example, consider FIG. 3 which illustrates an example environment 300 in which an anonymous container can be generated. In environment 300, the host operating system 102 is illustrated as including configuration settings and data 302, which in this example includes application configuration data 304, machine configuration data 306, and user settings 308. Application configuration data 304 includes data indicative of application installs and updates on the host operating system 102. Machine configuration data 306 includes data corresponding to the configuration of the computing device on which the host operating system 102 is implemented, such as a time, date, time zone, driver installs and updates, operating system settings, and sensor input. The user settings data 308 includes personal information of the user of computing device 102, such as username, user metadata, user files, and so forth.

In response to receiving a request to run an application in the host operating system 102, container manager 118 generates an anonymous container 310 that is isolated from host operating system 102 in which one or more applications 312 can execute. In order to create and activate the anonymous container 310, container manager 118 anonymizes the configurations setting and data 304 of the host operating system 102, and injects anonymous configuration settings and data 318 into the anonymous container 310. In this example, the anonymous configuration settings and data 318 includes anonymous application configuration data 320, anonymous machine configuration data 322, and anonymous user settings data 324. Notably, however, the anonymous container 310 may be injected with a variety of different types of anonymous data. Generally, the anonymous configuration and settings data 318 includes the same type of data as the configuration and settings data 302 of the host operating system 102. However, the data is anonymous and thus cannot be used to identify the user. In this way, if the application 312 includes malware 314 or attack software 316, they are restricted to execution within the anonymous container 310, and thus are unable to damage the host operating system 102. Furthermore, because the configuration and settings data is anonymous, the application 312, malware 314, and attack software 316 is unable to access or steal personal information from the user, or information that could be utilized to identify a location of the user, or generate a digital footprint of the user. In one or more implementations, the anonymous configuration and settings data 318 is stored in a format that can be added to an operating system image (e.g., at a later time) in order to anonymize the operating system image. Alternately, the anonymous configurations and settings data 318 is stored as part of an anonymous operating system image.

In some cases, container manager 118 generates the anonymous container 310 with a "pristine" configuration that is created from a pre-installed version of the host operating system 102. Doing so, makes it appear to the application 312 as though it is interacting with an operating system that has never been used. To generate the anonymous container 310 with a pristine configuration, container manager 118 generates a pristine set of the anonymous configuration settings and data 318 (e.g., registry hives and files corresponding to the host operating system) that corresponds to a newly installed host operating system 102. The pristine set of anonymous configuration settings and data 318 is then stored on the host operating system 102. Subsequently, each time that a new anonymous container 310 is to be activated for an application 312, container manager 118 accesses the pristine set of anonymous configuration and settings data 318 and, and injects the pristine configuration and setting data 318 into the anonymous container 310. Doing so, causes anonymous container 310 to appear, to application 312 as well as any malware 314 or attack software 316 associated with application 312, as a cleanly build installation of the host operating system 102.

In some cases, in order to ensure that the pristine set of configuration and settings data contain the appropriate settings, container manager 118 may create and pre-provision the pristine set of configuration and settings data offline in a build environment. In some embodiments, the pristine set of configuration and settings data may be created on the host operating system 102. The pristine set of configuration and settings data may be created on the host operating system 102 as the host operating system 102 first boots after install. During this time, the host operating system 102 has a pristine set of configuration and settings data (because it has not yet been used), and thus a copy or snapshot of the pristine set of configuration and settings data may be saved. Alternatively on the host operating system 102, a container or virtual machine may be first booted, and thus this container or virtual machine will have a pristine set of configuration and settings data, and thus a copy or snapshot of these may be saved. Alternatively, the host or a guest (virtual machine or container) may apply a reset mechanism (e.g., reset to factory defaults) in order to generate the pristine set of configuration and settings data.

Alternately or additionally, container manager 118 can make a dynamic image creation engine provisioning aware, taking default settings as input and using the pristine configuration and files as inputs, including these in the image at creation time. In some embodiments, the operating system is componentized.

In some cases, container manager 118 can be implemented to "randomize" the anonymous configuration and setting data 318. For example, container manager 118 can randomize the configuration and settings data 304 to generate randomized anonymous configuration and settings data 318, which is then injected into anonymous container 310. For example, a random username, random location, and random device type can be created and injected into the anonymous container 310. Thus, the randomized anonymous configuration and setting data 318 causes the container 310 to appear, to applications 312, malware 314, or attach software 316, as a random user's personal computing device.

In some cases, container manager 118 can be implemented to "spoof" the anonymous configuration and settings data 318. For example, the container manager 118 can "spoof" the anonymous configuration and settings data 318 with information about the user or computing device that intentionally misleads application 312, malware 314, and attack software 316. The spoofed information may include spoofed sensor input (e.g., location, accelerometer, light detection), a spoofed user identity (e.g., username and user metadata), spoofed machine configuration, spoofed application information, and so forth. For example, container manager 118 may generate the anonymous configuration and settings data 318 to indicate that the anonymous container 310 is in Tokyo, Japan (with the correct location, time, date, keyboard input, and other relevant settings) while the host operating system 102 is actually in New York. In some embodiments VPN may be used to connect the container to a VPN service that proxies the network connectivity in Tokyo, Japan as well. As another example, an organization may spoof the anonymous configuration and settings data to indicate that the host operating system is configured with a particular language in order to detect certain malware and attack software that attacks the particular language.

Figure 5:
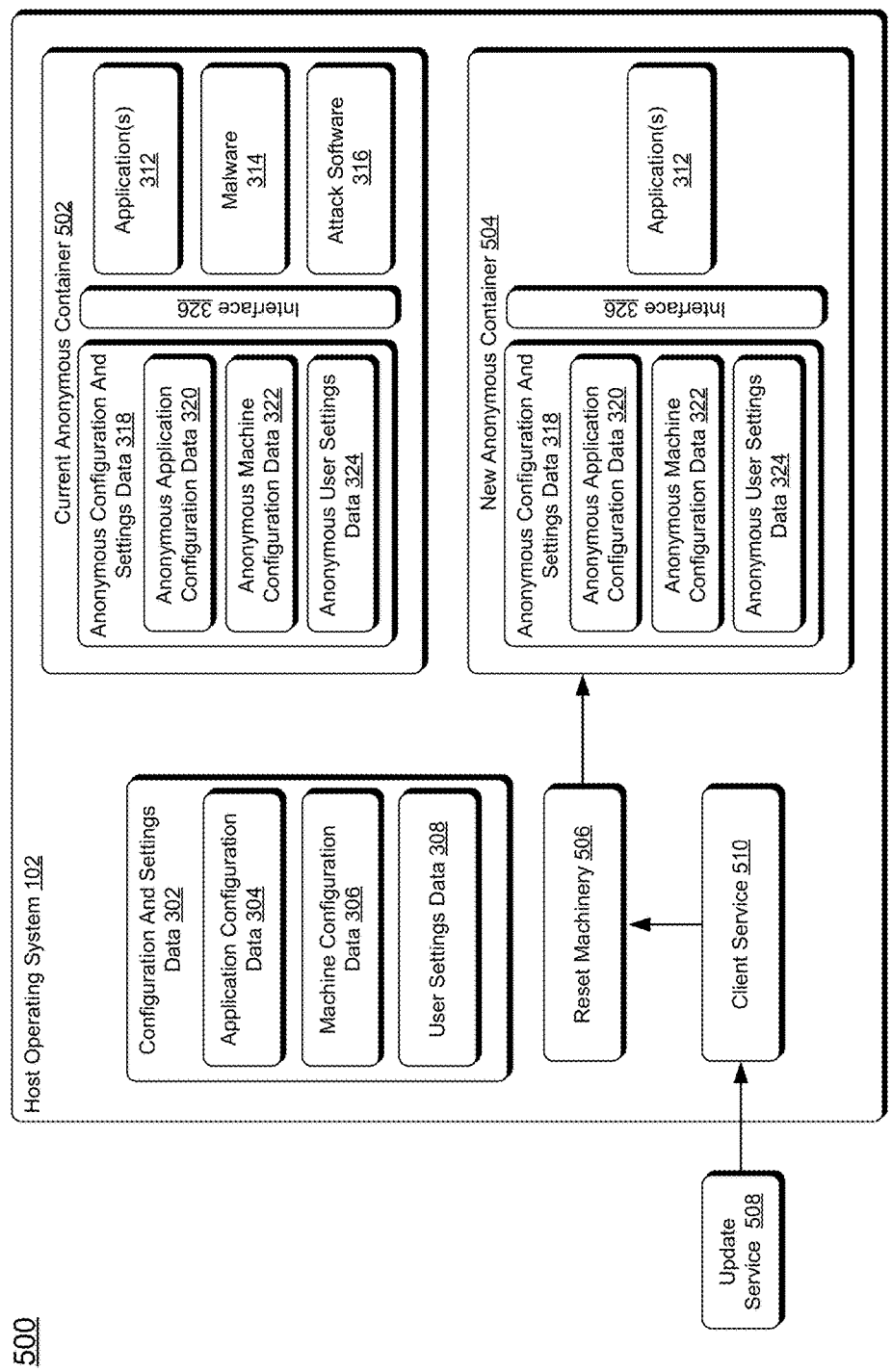
FIG. 5 which an example environment in which an anonymous container is regenerated using reset machinery.

In some embodiments, the configuration and settings data (e.g. the pristine data, random data, or spoofed data) must be serviced. This may be due to required changes to ensure compatibility with an updated operating system or application. If servicing is required, the configuration and files will need to be reconstructed as discussed above. If the regeneration of the configuration and files is not local to the host, a client service 510 (FIG. 5) can be implemented to download the updated data to the host. In a componentized operating system, the configuration and files may be bundled in a component that is recognized by the host operating system 102 and/or an update service 508 and the client service 510.

There are a variety of different ways in which container manager 118 can determine how to anonymize the container.

In some cases, container manager 118 may anonymize the configuration and settings data by enabling the user to control or set the configuration and settings and data. In other cases, the configuration and settings data may be spawned anonymously or randomly each time. In other cases, an enterprise or corporation controls and provisioning of the configuration and settings data for the user.

As illustrated in FIG. 3, application 312, as well as any malware 314 or attack software 316, can access the randomized configuration and settings data 318 via an interface 326. Thus, the applications 312, malware 314, and attack software 316 are able to function normally because they are permitted access to the configuration and settings data, but they are unaware that this information is not accurate configuration or settings data associated with a corporation, user, or device. Thus, if the anonymous container 310 is compromised, the configuration the files of the host operating system 102 are not compromised by a data breach created by the malware 314 or attack software 316 running in the anonymous container 310. Furthermore, as discussed throughout, after the session is over, the anonymous container 310 can be destroyed, which destroys malware 314 or attack software 316 executing in the anonymous container 310.

In some cases, container manager 118 is further configured to implement an application runtime distribution method in which applications 312 are distributed across multiple different anonymous containers 310. For example, a separate anonymous container 310 could be activated for each application 312, or the number of applications that are running in an anonymous container 310 could be limited to prevent all of the applications of a host operating system 102 from running in a single anonymous container 310. Doing so prevents applications 312 from detecting other applications installed on the host operating system 102, and thus the applications are unable to generate a fingerprint of the user or device based on the types of applications installed on the host operating system 102.

In various instances, anonymous containers 310 are terminated by host operating system 102. There are a variety of reasons that host operating system 102 may terminate an anonymous container 310, including an operating system servicing request, an application update, or in order to destroy malware or attack software executing in the anonymous container.

Container manager 118 is configured to regenerate an anonymous container 310, after termination, by layering any of the configurations and settings that are existing inside the container at the time of termination. For example, if the configuration and settings data has been spoofed to indicate that the user is in Tokyo (while the user is actuality in New York) then these settings can be copied and injected into the new anonymous container that is regenerated.

In one or more implementations, container manager 118 regenerates the anonymous container 310 using a configuration file package that includes settings and configurations usable to regenerate a new anonymous container.

Figure 4:
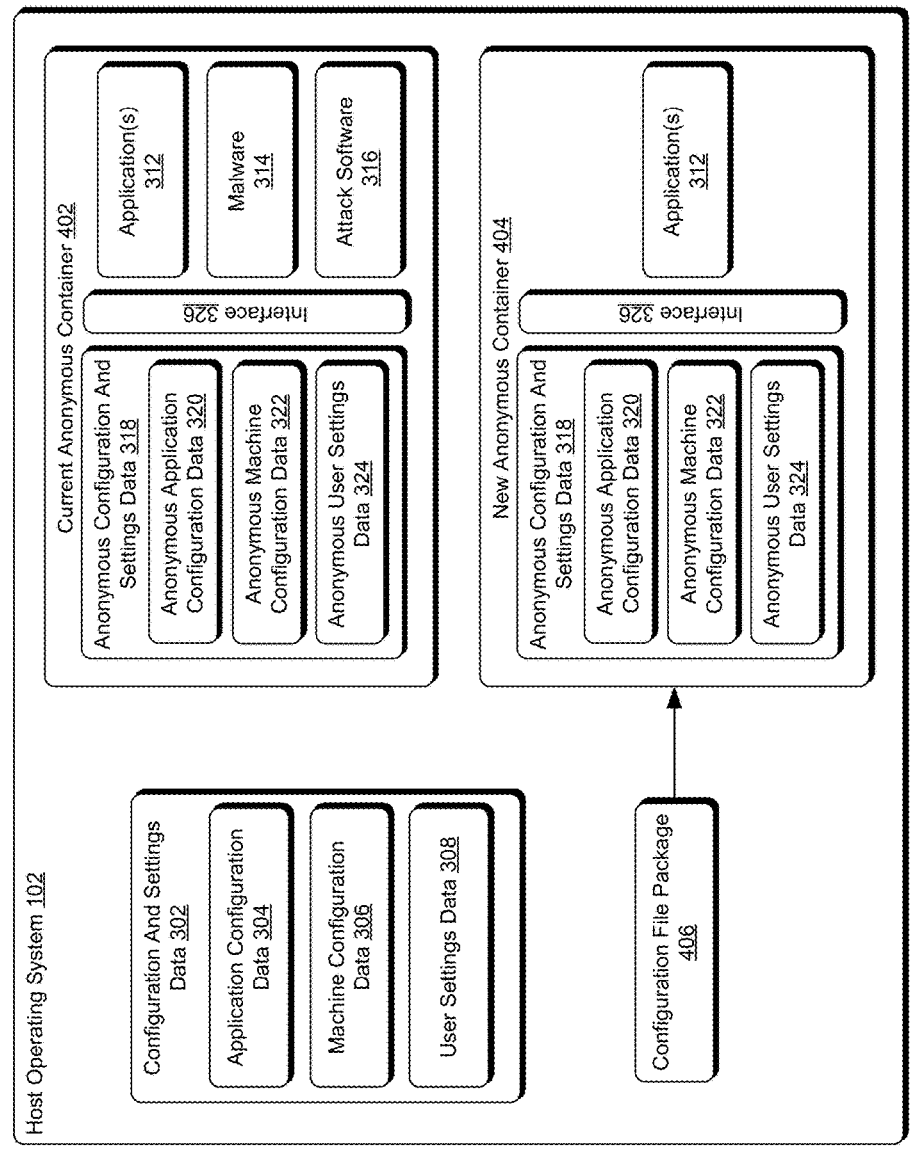
FIG. 4 which an example environment in which an anonymous container is regenerated using a configuration file package.

As an example, consider FIG. 4 which illustrates an example environment 400 in which an anonymous container is regenerated using a configuration file package. In this example, a current anonymous container 402 is terminated by host operating system 102. Subsequently, in order to regenerate the anonymous container, container manager 118 regenerates a new anonymous container 404 using a configuration file package 406. Notably, the new anonymous container 404 includes the same anonymous configuration and setting data 318 that was included in the current anonymous container 402 that was terminated. In some cases, the generation of new anonymous container 404 can be done in place, and the differences between the new configuration file package 406 and the current anonymous container 402 may be applied.

This configuration file package 406 includes a pristine set of container registry hives which are recreated on each build, and a recipe file which identifies re-usable files on the host operating system 102. Thus, the configuration file package 406 enables the quick and effective regeneration of the new anonymous container 404, also known as dynamic image creation. Notably, this unique method maintains both container security and user anonymity of the guest while seamlessly transferring guest settings to a new container image.

Alternately, in order to regenerate an anonymous container, the container manager 118 may utilize reset machinery that utilizes serviced artifacts on the host operating system 102. As an example, consider FIG. 5 which illustrates an example environment 500 in which an anonymous container is regenerated using reset machinery. In this example, a current anonymous container 502 is terminated by host operating system 102. Subsequently, in order to regenerate the anonymous container, container manager 118 regenerates a new anonymous container 504 using reset machinery 506. In order to implement the regeneration process efficiently and the in the least time, the reset machinery 506 may utilize API calls between an update service 508 (located remote from the host operating system 102) and a client service 510.

In this cases, the reset machinery generates an adaptable base layer by resetting the host operating system 102. Then another layer of configurations and settings data (e.g., user settings and application data) from the current anonymous container 502 is layers on top of the base layer. Doing so guarantees both anonymity and security of the new anonymous container 504, while preserving mutable settings.

In many environments, the user's identity and credentials (e.g., name, password, and so forth) are highly valuable. Effective observers who are able to pillage such credentials can then spoof the user's identity in order to obtain unlimited access to protected information. Thus, in one or more implementations, container manager 118 is configured to protect a user's control channel information, such as user credentials, by creating a credential proxy that is configured to manage credentials that are entered in an anonymous container.

Figure 6:
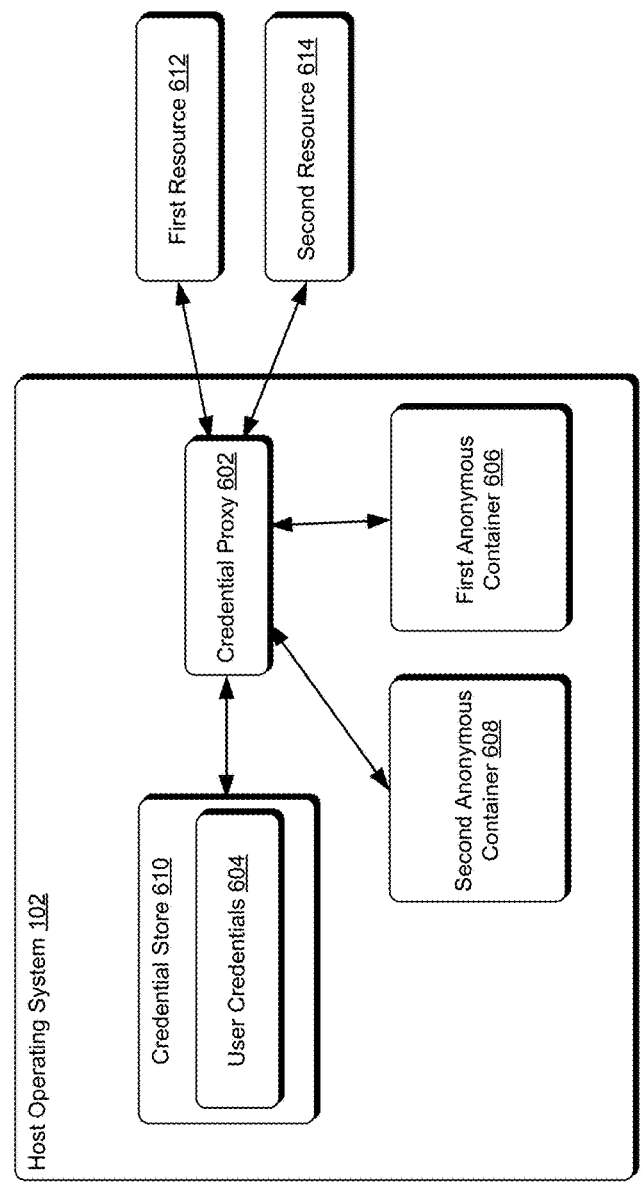
FIG. 6 illustrates an example environment in which a credential proxy is implemented to manage credentials entered in anonymous containers.

As an example, consider FIG. 6 which illustrates an example environment 600 in which a credential proxy is implemented to manage credentials entered in anonymous containers. In this example, a credential proxy 602 is implemented in the host operating system 102, and is configured to manage user credentials 604 that are entered in an anonymous container, which in this example include a first anonymous container 606 and a second anonymous container 608. Also illustrated in FIG. 6 is a credential store 610 that stores the user credentials 608, and resources (illustrated as first resource 612 and second resource 614) which can be accessed by the user credentials 604.

In one or more implementations, the credential proxy 602 is backed by a trusted platform module (TPM) that includes a certificate and an associated key pair used to identify the system, attest that the host operating system 102 actually has the TPM and the private key associated with the certificate, and then to provision the user credentials 604 to that system.

In this example, the user credentials 604 to a given set of resources 612 and 614 are managed by the credential proxy 602 of the host operating system 102, and the set of trust relationships is pre-registered between the host operating system 102 and the set of resources. Thus, to access a given resource, the user enters a PIN or one-time password via the host operating system 102, which causes the credential proxy 602 on the host operating system 102 to enter the actual user credentials 604 thereby allowing access to the data from the set of resources without the actual user credentials 604 being transmitted from the credential store 610 to the anonymous container.

For instance, in FIG. 6, in order for first container 606 to access first resource 612, the first container 606 queries the credential proxy 602. In response to this query, the credential proxy 602 authenticates with the first resource 612. Doing so enables first anonymous container 606 to access the first resource 612 without the user credentials 604 being transmitted to the first anonymous container 606. Similarly, in order for the second container 608 to access second resource 614, the second container 608 queries the credential proxy 602. Credential proxy 602 then authenticates with second resource 614. Doing so enables second container 608 to access the second resource 614 without the user credentials 604 being transmitted to the second anonymous container 608. In one or more implementations, the credential proxy 602 and/or the credential store 610 may be implemented as a service that runs remote from the host operating system 102.

In some environments, protecting the user's data, in addition to the user's name and credentials, is critical. Thus, in one or more implementations container manager 118 is further configured to protect a user's data. To do so, container manager 118 implements a pipeline processing method to be used in conjunction with the credential proxy 602. Doing so provides a secure transit for a potentially infected anonymous container.

Figure 7:
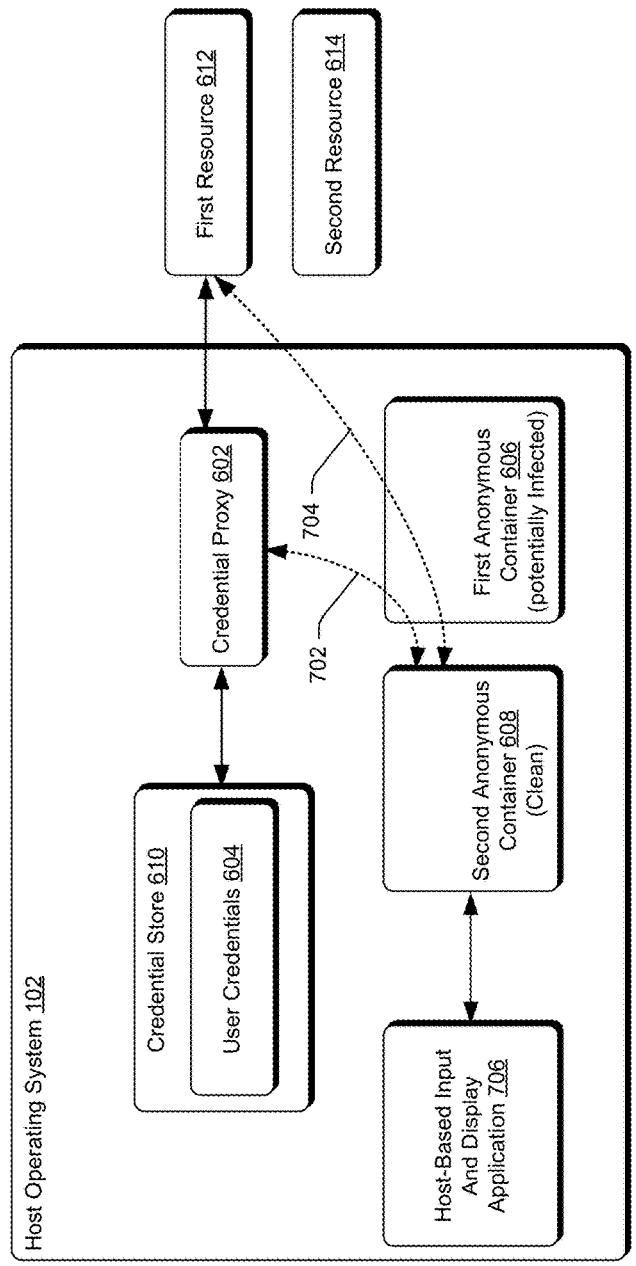
FIG. 7 illustrates an environment in which a pipeline processing method to protect user data can be implemented.

Consider, for example, FIG. 7 which illustrates an environment 700 in which a pipeline processing method to protect user data can be implemented. In this example, first anonymous container 606 is illustrated as being potentially infected, while second anonymous container 608 is illustrated as being clean. In order to relay user credentials 604 and user data, a first secure channel 702 (e.g., HTTPs or IPsec) is created between second container 608 and credential proxy 602. Doing so authenticates to first resource 612. Then, a second secure channel 704 is created through first container 606 to first resource 612. The second secure channel 704 appears as though it originated from first container 606 because it has the same IP address and other settings of the first anonymous container, when it fact it actually originated form second container 608. Then data is shared from the first resource 612 to second container 608 and displayed on the host operating system 102 via a host-based input and display application 706. In other implementations, the containers may be parallelized by directly opening second container 608 to access first resource 612, thereby bypassing first container 606. In some implementations, policy will be applied to protect certain data from first anonymous container 606, while dumping other data in first anonymous container 606. One example may include using first anonymous container 606 as a quarantine. Certain risky data is opened and validated in first anonymous container 606, which may potentially infect first anonymous container 606, but will not infect the rest of the system. Another example may include a multi-level quarantine implemented with several containers to handle multiple data categories such as enterprise data, personal data, anonymous data and so forth. These containers may have different user profiles, different applications installed, and so forth. Routing between these containers may be serial, parallel, or follow any other structure that ensures the quarantine remains in effect, minimizing data exposure to malicious actors.

Other ways in which container manager 118 can ensure that the anonymous containers remain clean can include giving the containers an ephemeral lifetime, placing restrictions on what types of applications or executables can be run in the container, placing restrictions on what types of applications or executables can be installed in the container, or utilizing an antivirus that blocks all unknown application installs.

In one or more implementations, container manager 118 is configured to distract an observer in order to achieve anonymity. One way in which the observer can be distracted is by making the container "familiar" thereby inducing "recognition errors".

The container can be made familiar in a variety of different ways. One way in which the container can be made familiar, is by making the settings familiar, which can include by way of example and not limitation, the text strings in the user name, a picture of the user, biometric information of the user, a region or location of the user, a language of the anonymous container, common hardware and/or drivers that are used in the region or location of the user, or common applications that are used in the region or location of the user. Information usable to make the container familiar can be collected from the Internet, publications on "most popular apps" and telemetry. Certain types of information may be artificially generated, such as images. Noise or "blotches" may also be added to images to make identification more difficult.

Figure 8:
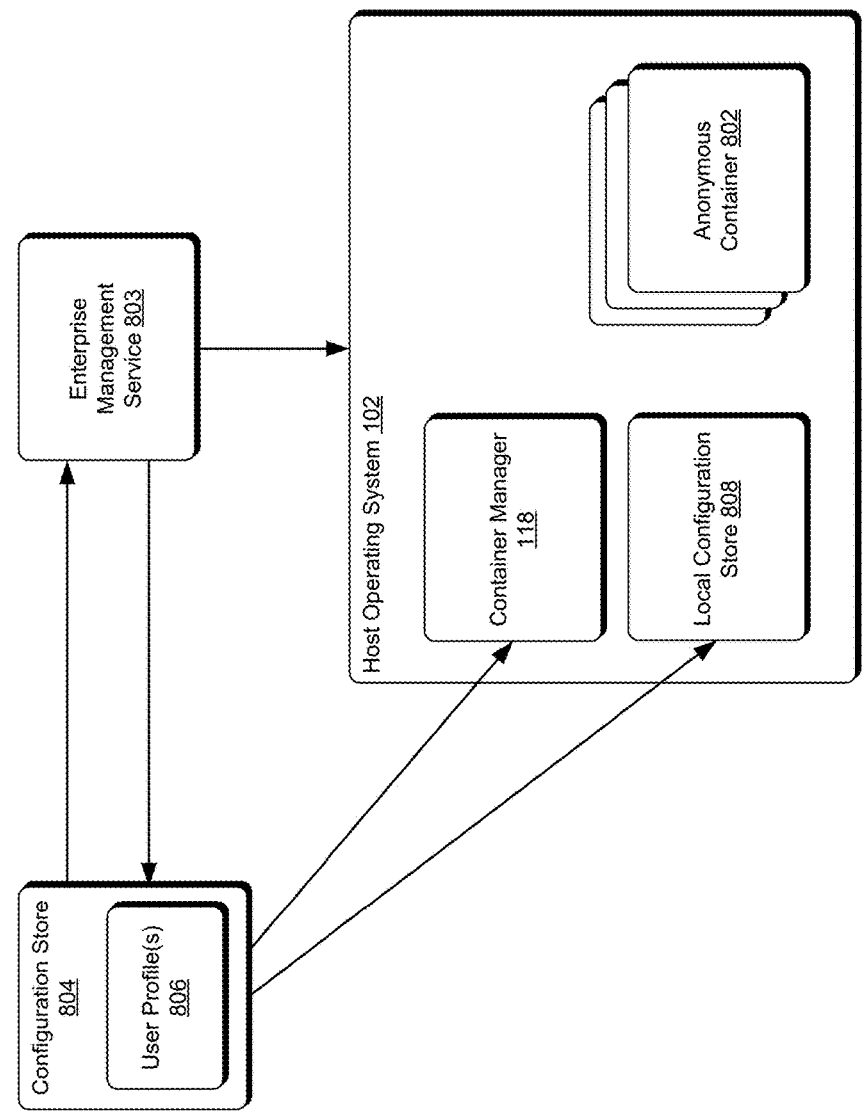
FIG. 8 illustrates an environment in which a configuration store is implemented to store information usable to make a container familiar.

This information may be collected in a configuration store and stored in a set of user profiles. Consider, for example, FIG. 8 which illustrates an environment 800 in which a configuration store is implemented to store information usable to make a container familiar. In this example, information usable to make an anonymous container 802 familiar is stored in a configuration store 804 as a set of user profiles 806. The configuration stored 804 is communicatively coupled to an enterprise management service 803, which can also communicate with the host operating system 102. One or more of the user profiles 806 can be provided to the host operating system 102. The container manager 118 can then inject the user profiles 806 into one or more anonymous containers 802. In one or more implementations, this may include pre-installing common applications and drivers.

In some implementations, the host operating system 102 may have its own local configuration store 808. The container manager 118 may enable the user to select a user profile for use in the anonymous container. In some cases, the container manager 118 reserves a user profile to ensure that no two user profiles are applied simultaneously.

In one or more implementations, the container can be made familiar by making "usage" familiar. Doing so causes an observer to see a person using a set of common applications that are being run and transactions with those applications, and a set of devices and drivers that send and receive an expected input and output.

Information to make the container familiar may be collected via telemetry or other means. The information may reside in the configuration store 804 discussed above, or in a separate configuration store. It may also be stored in a user profile 806, or in different data structure. The container manager 118 reads the information and from this information, creates an emulation of the active user. In some implementations, this may include interacting with real user accounts and cloud services, including but not limited to social networking, email, and online shopping.

Example Procedures

Figure 9:
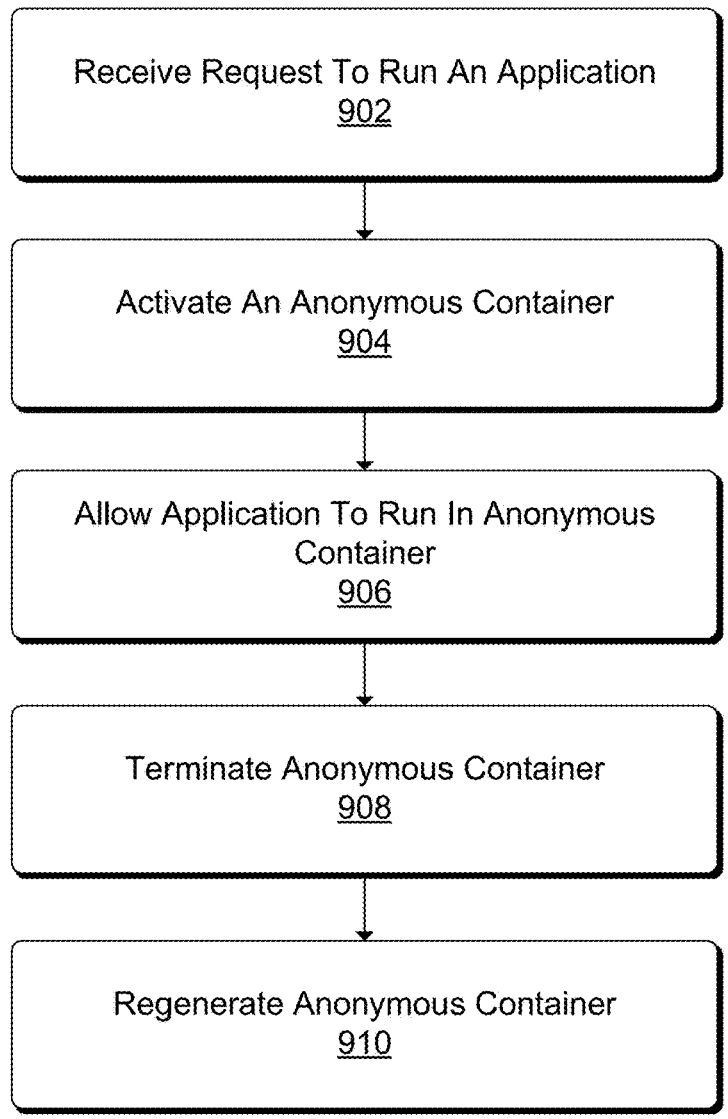
FIG. 9 is a flowchart illustrating an example process for implementing anonymous containers in accordance with one or more embodiments.

FIG. 9 is a flowchart illustrating an example process 900 for implementing anonymous containers in accordance with one or more embodiments. Process 900 is carried out by a system, such as system 100 of FIG. 1, and can be implemented in software, firmware, hardware, or combinations thereof. Process 900 is shown as a set of acts and is not limited to the order shown for performing the operations of various acts. Process 900 is an example process for implementing anonymous containers; additional discussions of implementing anonymous containers are included herein with reference to different figures.

At 902, a request is received to run an application. The request is detected by a host operating system 102 when a user, administrator, program, application, or other entity of the system runs an application such as a web browser.

At 904, in response to the request, an anonymous container is activated. For example, container manager 118 activates an anonymous container 310 that is isolated from the host operating system 102. In order to create and activate the anonymous container 310, container manager 118 anonymizes the configurations setting and data 304 of the host operating system 102, and injects anonymous configuration settings and data 318 into the anonymous container 310. The anonymous configuration settings and data 318 includes anonymous application configuration data 320, anonymous machine configuration data 322, and anonymous user settings data 324.

In some cases, container manager 118 generates the anonymous container 310 with a "pristine" configuration that is created from a pre-installed version of the host operating system 102. Alternately or additionally, container manager 118 can be implemented to "randomize" or "spoof" the anonymous configuration and setting data 318.

At 906, the application is allowed to run in the anonymous container. For example, application 312 is allowed to run in anonymous container 310, and any malware 314 or attack software 316, is also restricted to running in the anonymous container 310. As such, application 312, malware 314, and attack software 316 are restricted to accessing the anonymous configuration and settings data 318.

At 908, the anonymous container is terminated. For example, container manager 118 terminates the anonymous container 310 in response to an operating system servicing request, an application update, or in order to destroy malware or attack software executing in the anonymous container.

At 910, the anonymous container is regenerated. For example, container manager 118 regenerates an anonymous container 310, after termination, by layering any of the configurations and settings that are existing inside the container at the time of termination. For example, if the configuration and settings data has been spoofed to indicate that the user is in Tokyo (while the user is actuality in New York) then these settings can be copied and injected into the new anonymous container that is regenerated.

Example System

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 10:
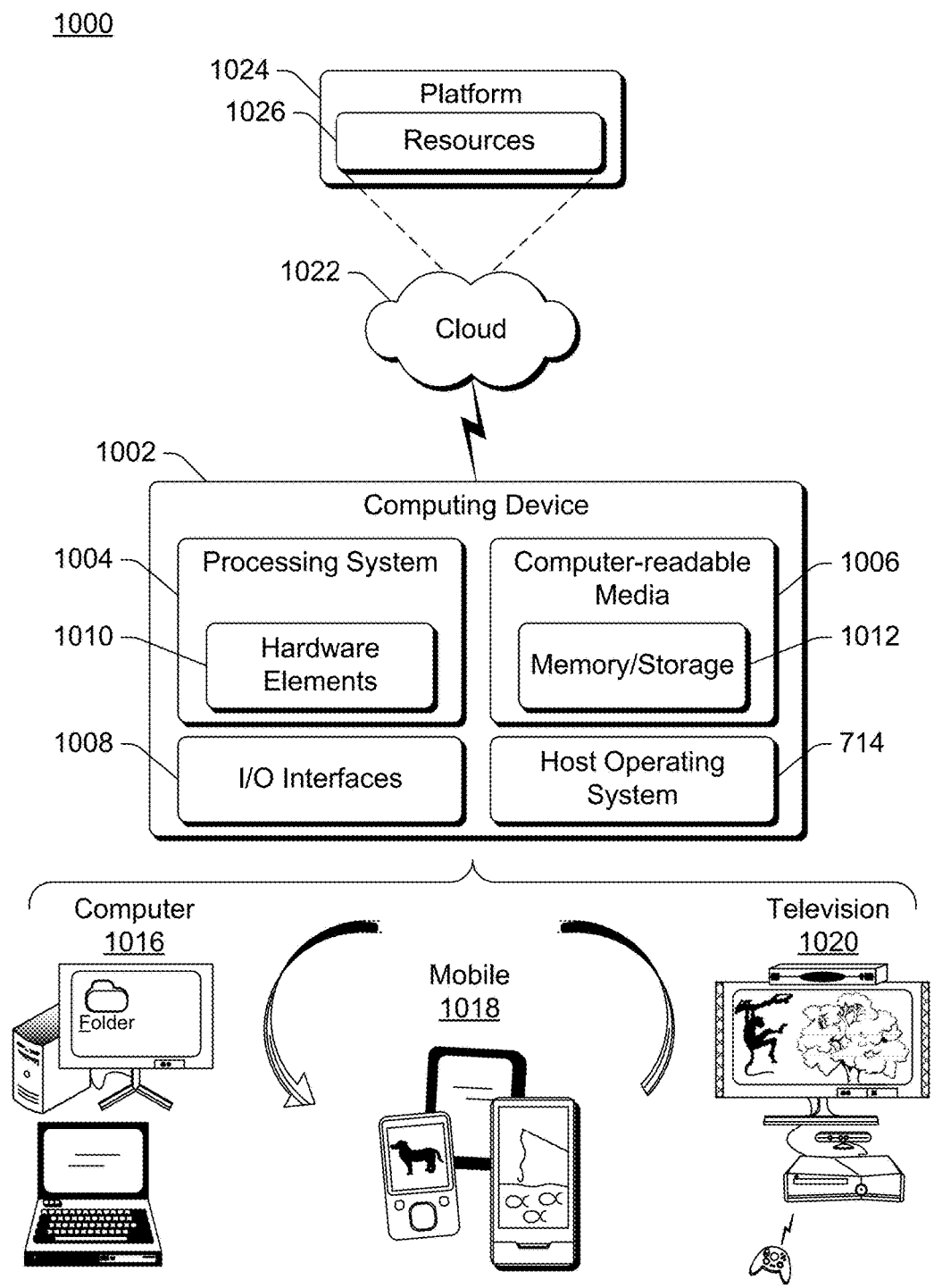
FIG. 10 illustrates an example system that includes an example computing device that is representative of one or more systems and/or devices that may implement the various techniques described herein.

FIG. 10 illustrates an example system generally at 1000 that includes an example computing device 1002 that is representative of one or more systems and/or devices that may implement the various techniques described herein. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O Interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), resistive RAM (ReRAM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

The one or more input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), a sensor (e.g. an ambient light sensor or a motion sensor), and so forth. Examples of output devices include a display device (e.g., a monitor or projector), speakers, a printer, a network card, tactile-response device, and so forth. Thus, the computing device 1002 may be configured in a variety of ways as further described below to support user interaction.

The computing device 1002 also includes a host operating system 1014. The host operating system 1014 provides various management of hardware-based virtualized security isolation, as discussed above. The host operating system 1014 can implement, for example, the host operating system 102 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules as a module that is executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1016, mobile 1018, and television 1020 uses. Each of these configurations includes devices that may have generally different constructs and capabilities, and thus the computing device 1002 may be configured according to one or more of the different device classes. For instance, the computing device 1002 may be implemented as the computer 1016 class of a device that includes a personal computer, desktop computer, a multi-screen computer, laptop computer, netbook, and so on.

The computing device 1002 may also be implemented as the mobile 1018 class of device that includes mobile devices, such as a mobile phone, portable music player, portable gaming device, a tablet computer, a multi-screen computer, and so on. The computing device 1002 may also be implemented as the television 1020 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. This functionality may also be implemented all or in part through use of a distributed system, such as over a "cloud" 1022 via a platform 1024 as described below.

The cloud 1022 includes and/or is representative of a platform 1024 for resources 1026. The platform 1024 abstracts underlying functionality of hardware (e.g., servers) and software resources of the cloud 1022. The resources 1026 may include applications and/or data that can be utilized while computer processing is executed on servers that are remote from the computing device 1002. Resources 1026 can also include services provided over the Internet and/or through a subscriber network, such as a cellular or Wi-Fi network.

The platform 1024 may abstract resources and functions to connect the computing device 1002 with other computing devices. The platform 1024 may also serve to abstract scaling of resources to provide a corresponding level of scale to encountered demand for the resources 1026 that are implemented via the platform 1024. Accordingly, in an interconnected device embodiment, implementation of functionality described herein may be distributed throughout the system 1000. For example, the functionality may be implemented in part on the computing device 1002 as well as via the platform 1024 that abstracts the functionality of the cloud 1022. It should be noted that the cloud 1022 can be arranged in a myriad of configurations. For example, the cloud 1022 can be implemented as a single cloud, as multiple instances of cloud 1022 all behaving as a single cloud, or with one or more instances of platform 1024 implemented behind the cloud 1022 and behaving as if the one or more instances of platform 1024 were implemented in the cloud.

In the discussions herein, various different embodiments are described. It is to be appreciated and understood that each embodiment described herein can be used on its own or in connection with one or more other embodiments described herein.

Conclusion and Example Implementations

Example implementations described herein include, but are not limited to, one or any combinations of one or more of the following examples:

In one or more examples, a method comprises: receiving a request to run an application in a host operating system; activating, by the host operating system, an anonymous container that is isolated from the host operating system and includes anonymous configuration and settings data; and allowing the application to run in the anonymous container.

An example as described alone or in combination with any of the other examples described above or below, wherein the anonymous configuration and settings data includes one or more of anonymous application configuration data, anonymous machine configuration data, or anonymous user settings data.

An example as described alone or in combination with any of the other examples described above or below, wherein the anonymous configuration and settings data comprises a pristine set of the configuration and settings data corresponding to a newly installed host operating system.

An example as described alone or in combination with any of the other examples described above or below, wherein the pristine set of the configuration and settings data is created as part of an operating system compilation and media creation.

An example as described alone or in combination with any of the other examples described above or below, wherein the pristine set of the configuration and settings data is created locally on the host operating system.

An example as described alone or in combination with any of the other examples described above or below, wherein the anonymous configuration and settings data is randomized or spoofed.

An example as described alone or in combination with any of the other examples described above or below, wherein the anonymous configuration and settings data is stored in a format that can be added to an operating system image in order to anonymize the operating system image, or wherein the anonymous configuration and settings data is stored as part of an anonymous operating system image.

An example as described alone or in combination with any of the other examples described above or below, wherein the host operating system is further configured to activate a separate anonymous container for at least one additional application in response to receiving a request from the at least one additional application to run in the host operating system.

An example as described alone or in combination with any of the other examples described above or below, further comprising terminating the anonymous container in response to an operating system servicing request, an application update, or detection of malware or attack software executing in the anonymous container.

An example as described alone or in combination with any of the other examples described above or below, further comprising regenerating a new anonymous container with the anonymous configuration and settings data, and allowing the application to run in the new anonymous container.

An example as described alone or in combination with any of the other examples described above or below, wherein the anonymous configuration and settings data of the host operating system is paired with a VPN service to spoof a network location.

An example as described alone or in combination with any of the other examples described above or below, further comprising accessing one or more resources by interacting with a credential proxy implemented in the host operating system, the credential proxy configured to access user credentials stored in a credential store and provide the user credentials to the one or more resources for access without the user credentials being transmitted from the credential store to the anonymous container.

An example as described alone or in combination with any of the other examples described above or below, further comprising making settings of the anonymous container familiar.

An example as described alone or in combination with any of the other examples described above or below, wherein the settings comprise one or more of text strings of a user name, a picture of a user, biometric information of the user, a region or location of the user, a language of the anonymous container, common hardware or drivers that are used in the region or location of the user, or common applications that are used in the region or location of the user.

An example as described alone or in combination with any of the other examples described above or below, further comprising collecting information usable to make the settings of the anonymous container familiar, and storing the information in one or more user profiles in a configuration store.

An example as described alone or in combination with any of the other examples described above or below, wherein making settings of the anonymous container familiar further comprises injecting one of the user profiles into the anonymous container.

An example as described alone or in combination with any of the other examples described above or below, wherein making settings of the anonymous container familiar further comprises pre-installing common applications and drivers.

An example as described alone or in combination with any of the other examples described above or below, further comprising making usage of the anonymous container familiar by interacting with one or more user accounts or cloud services.

An example as described alone or in combination with any of the other examples described above or below, wherein the host operating system is further configured to activate one or more additional anonymous containers to run at the same time as the anonymous container in the host operating system.

In one or more examples, a system comprises: a host operating system; at least a memory and a processor to implement a container manager implemented in the host operating system, the container manager configured to: receive a request to run an application in the host operating system; activate an anonymous container that is isolated from the host operating system and includes anonymous configuration and settings data; and allow the application to run in the anonymous container.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method, comprising:
    receiving a request to run an application in a computing device having a host operating system with corresponding a first set of application data, machine configuration data, or user settings data; and
    in response to receiving the request,
        activating, by the host operating system, a container that is isolated from directly accessing the first set of application data, machine configuration data, or user settings data in the host operating system;
        anonymizing the first set of application data, machine configuration data, or user settings data of the host operating system into a second set of application data, machine configuration data, or user settings data different than the first set, respectively;
        injecting the anonymized second set of application data, machine configuration data, or user settings data into the activated container; and
        allowing the application to run in the activated container and access the injected anonymized second set of application data, machine configuration data, or user settings data instead of the first set of application data, machine configuration data, or user settings data in the host operating system.

2. The method of claim 1, wherein the anonymized second set of application data, machine configuration data, or user settings data comprises a set of application data, machine configuration data, or user settings data corresponding to a newly installed host operating system.

3. The method of claim 2, wherein the set of the application data, machine configuration data, or user settings data is created as part of an operating system compilation and media creation.

4. The method of claim 2, wherein the set of the configuration and settings data is created locally on the host operating system.

5. The method of claim 1, wherein the anonymized second set of application data, machine configuration data, or user settings data is randomized or spoofed.

6. The method of claim 1, wherein the anonymized second set of application data, machine configuration data, or user settings data is stored in a format that can be added to an operating system image in order to anonymize the operating system image.

7. The method of claim 1, wherein the host operating system is further configured to activate a separate container for at least one additional application in response to receiving a request from the at least one additional application to run in the host operating system.

8. The method of claim 1, further comprising terminating the activated container in response to an operating system servicing request, an application update, or detection of malware or attack software executing in the activated container.

9. The method of claim 8, further comprising regenerating a new container with the anonymized second set of application data, machine configuration data, or user settings data, and allowing the application to run in the regenerated container.

10. The method of claim 1, wherein the anonymized second set of application data, machine configuration data, or user settings data of the host operating system is paired with a virtual private network (VPN) service to spoof a network location.

11. The method of claim 1, further comprising accessing one or more resources by interacting with a credential proxy implemented in the host operating system, the credential proxy being configured to access user credentials stored in a credential store and provide the user credentials to the one or more resources for access without the user credentials being transmitted from the credential store to the activated container.

12. The method of claim 1, wherein the anonymized second set of application data, machine configuration data, or user settings data comprise one or more of text strings of a user name, a picture of a user, biometric information of the user, a region or location of the user, a language of the container, hardware or drivers that are used in the region or location of the user, or applications that are used in the region or location of the user.

13. The method of claim 1, wherein the host operating system is further configured to activate one or more additional containers to run at the same time as the activated container in the host operating system.

14. A computing device, comprising:
a processor; and
a memory operatively coupled to the processor, the memory having instructions executable by the processor to provide a host operating system having a first set of application data, machine configuration data, or user settings data and to cause the computing device to:
upon receiving a request to run an application in the computing device,
activate, by the host operating system, a container that is isolated from directly accessing the first set of application data, machine configuration data, or user settings data in the host operating system;
inject a second set of application data, machine configuration data, or user settings data into the activated container, the second set of application data, machine configuration data, or user settings data being anonymized from and different than the first set of application data, machine configuration data, or user settings data, respectively; and
execute the application in the activated container, the injected second set of application data, machine configuration data, or user settings data being accessible to the executed application instead of the first set of application data, machine configuration data, or user settings data in the host operating system.

15. The computing device of claim 14, wherein the second set of application data, machine configuration data, or user settings data comprises a set of application data, machine configuration data, or user settings data corresponding to a newly installed host operating system.

16. The computing device of claim 14, wherein the second set of application data, machine configuration data, or user settings data comprises randomized or spoofed first set of application data, machine configuration data, or user setting data.

17. The computing device of claim 14, wherein the memory includes additional instructions executable by the processor to cause the computing device to:
activate another container for another application in response to receiving a request from the another application to run in the host operating system; and
inject a third set of application data, machine configuration data, or user settings data into the activated another container, the third set of application data, machine configuration data, or user settings data being anonymized from the first set of application data, machine configuration data, or user settings data but is different from the second set of application data, machine configuration data, or user settings data.

18. A method performed in a computing device having a processor and a memory having instructions executable by the processor to provide a host operating system having a first set of application data, machine configuration data, or user settings data, the method comprising:
upon receiving a request to run an application in the computing device,
activating, by the host operating system, a container that is isolated from directly accessing the first set of application data, machine configuration data, or user settings data in the host operating system;
injecting a second set of application data, machine configuration data, or user settings data into the activated container, the second set of application data, machine configuration data, or user settings data being anonymized from and different than the first set of application data, machine configuration data, or user settings data, respectively; and
executing the application in the activated container, the executed application having access to the injected second set of application data, machine configuration data, or user settings data instead of the first set of application data, machine configuration data, or user settings data in the host operating system.

19. The method of claim 18, wherein the second set of application data, machine configuration data, or user settings data comprises a set of application data, machine configuration data, or user settings data corresponding to a newly installed host operating system, or randomized first set of application data, machine configuration data, or user setting data, respectively.

20. The method of claim 18, further comprising:
activating another container for another application in response to receiving a request from the another application to run in the host operating system; and
injecting a third set of application data, machine configuration data, or user settings data into the activated another container, the third set of application data, machine configuration data, or user settings data being anonymized from the first set of application data, machine configuration data, or user settings data but is different from the second set of application data, machine configuration data, or user settings data.

* * * * *